US011929020B2

(12) United States Patent
Yoon et al.

(10) Patent No.: US 11,929,020 B2
(45) Date of Patent: Mar. 12, 2024

(54) DISPLAY DEVICE AND METHOD OF DRIVING DISPLAY DEVICE

(71) Applicant: Samsung Display Co., Ltd., Yongin-Si (KR)

(72) Inventors: Changnoh Yoon, Seoul (KR); Sangan Kwon, Cheonan-si (KR); Soon-Dong Kim, Osan-si (KR); Taehoon Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/084,559

(22) Filed: Dec. 20, 2022

(65) Prior Publication Data

US 2023/0245619 A1 Aug. 3, 2023

(30) Foreign Application Priority Data

Feb. 3, 2022 (KR) ........................ 10-2022-0014134

(51) Int. Cl.

| | |
|---|---|
| ***G09G 3/3208*** | (2016.01) |
| ***G09G 3/3233*** | (2016.01) |
| ***G09G 5/10*** | (2006.01) |

(52) U.S. Cl.

CPC ... *G09G 3/3208* (2013.01); *G09G 2300/0819* (2013.01); *G09G 2300/0842* (2013.01); *G09G 2310/0245* (2013.01); *G09G 2310/0262* (2013.01); *G09G 2310/027* (2013.01); *G09G 2310/08* (2013.01); *G09G 2320/0686* (2013.01); *G09G 2330/028* (2013.01); *G09G 2360/16* (2013.01)

(58) Field of Classification Search

CPC ......... G09G 3/3208; G09G 2300/0819; G09G 2300/0842; G09G 2310/0245; G09G 2310/0262; G09G 2310/027; G09G 2310/08; G09G 2320/0686; G09G 2330/028; G09G 2360/16; G09G 3/3225; G09G 3/3233; G09G 3/3291

See application file for complete search history.

(56) References Cited

U.S. PATENT DOCUMENTS

| | | | | |
|---|---|---|---|---|
| 10,878,752 | B1 * | 12/2020 | Li | G09G 3/3225 |
| 2018/0293944 | A1 * | 10/2018 | Kim | G09G 3/3233 |
| 2020/0234470 | A1 * | 7/2020 | Chen | G09G 5/02 |
| 2020/0388228 | A1 * | 12/2020 | Oh | G09G 5/373 |

(Continued)

*Primary Examiner* — Antonio Xavier

(74) *Attorney, Agent, or Firm* — Innovation Counsel LLP

(57) ABSTRACT

A display device includes a display panel, a power supply unit, a voltage adjustment signal provider, and a data adjustment signal provider. The display panel includes a first display area and a second display area. The power supply unit is configured to provide a first initialization voltage and a second initialization voltage to the display panel. The voltage adjustment signal provider is configured to provide an adjustment signal to the power supply unit for applying an adjustment voltage to the second initialization voltage when the second display area is driven at a frequency lower than at least one of a predetermined frequency and a driving frequency of the first area. The data adjustment signal provider is configured to provide a data adjustment signal for adjusting gray levels of some pixels included in the first display area when the adjustment voltage is applied to the second initialization voltage.

20 Claims, 20 Drawing Sheets

(56) References Cited

U.S. PATENT DOCUMENTS

| | | | | |
|---|---|---|---|---|
| 2022/0114943 | A1* | 4/2022 | Cao | G09G 3/3291 |
| 2023/0178013 | A1* | 6/2023 | Oh | G09G 3/3648<br>345/690 |

* cited by examiner

FIG. 13

| DBV | 255G (nit) | Min Gray (0.2 nit) | Max Gray (1 nit) |
|---|---|---|---|
| n | 1000 | 6 | 11 |
| ... | ... | ... | ... |
| 4 | 183 | 12 | 24 |
| 3 | 98 | 16 | 32 |
| 2 | 50 | 21 | 44 |
| 1 | 2 | 90 | 187 |

FIG. 19

| DBV | GRAY SECTION | MIN GRAY | MAX GRAY | COMP. DECISION VALUE | GRAY COMP. VALUE |
|---|---|---|---|---|---|
| 1 | R1 | 90 | 99 | 8 | −2 |
| | R2 | 100 | 109 | 7 | −2 |
| | ... | ... | ... | ... | ... |
| | Rm | 180 | 187 | 4 | −1 |
| 2 | R1 | 21 | 25 | 5 | −2 |
| | R2 | 26 | 29 | 4 | −1 |
| | ... | ... | ... | ... | ... |
| | Ro | 40 | 44 | 2 | −1 |
| n | R1 | 6 | 8 | 3 | −1 |
| | R2 | 9 | 11 | 2 | −1 |

DISPLAY DEVICE AND METHOD OF DRIVING DISPLAY DEVICE

CROSS-REFERENCE TO RELATED APPLICATION

This application claims priority under 35 USC § 119 to Korean Patent Application No. 10-2022-0014134 filed on Feb. 3, 2022 in the Korean Intellectual Property Office (KIPO); the Korean Patent Application is incorporated by reference.

BACKGROUND

1. Field

The technical field is related a display device and a method of driving a display device.

2. Description of the Related Art

A display device may include pixels for displaying images in response to input signals. Modern display devices include liquid crystal display devices, organic light emitting display devices, quantum dot display devices, and the like.

A display device may be driven at different frequencies. In order to reduce the power consumption of the pixels of the display device, when the pixels display a still image, a driving frequency of the pixels may be reduced to drive the display device at a low frequency. When the display device is driven at the low frequency, the luminance of the pixels may be undesirably reduced as the low frequency driving time increases.

SUMMARY

Embodiments may be related to a display device.

Embodiments may be related to a method of driving a display device.

According to embodiments, a display device includes a display panel, a power supply unit, a low frequency offset compensator, and a high frequency data compensator. The display panel includes first and second display areas in which pixels are disposed. The power supply unit is configured to generate a first initialization voltage and a second initialization voltage, and provide the first initialization voltage and the second initialization voltage to the pixels. The low frequency offset compensator is configured to selectively apply an offset to the second initialization voltage when the second display area is driven at a low frequency. The high frequency data compensator is configured to compensate for gray levels of some of the pixels disposed in the first display area when the offset is applied to the second initialization voltage.

The low frequency offset compensator may measure a number of pixel data corresponding within a preset low gray level range based on gray level information of the pixel data corresponding to the second display area and included in image data.

When the number of the pixel data corresponding within the preset low gray level range is greater than or equal to a preset number, the low frequency offset compensator may apply the offset to the second initialization voltage.

When the number of the pixel data corresponding within the preset low gray level range is less than or equal to a preset criterion, the low frequency offset compensator may be configured not to apply the offset to the second initialization voltage.

The preset low gray level range may be about 0.2 nits to about 1 nit.

The low frequency offset compensator may include a first memory, a first calculator, and a first compensation signal generator. The first memory may store display brightness value (DBV) data and a low gray level range corresponding to each of the display brightness value data. The first calculator may determine whether the second display area of the display panel is driven at the low frequency based on the image data, select DBV data corresponding to a brightness of the display panel, and determine a low gray level range of the selected DBV data. The first compensation signal generator may generate a compensation signal, and provide the compensation signal to the power supply unit.

The display device may further include a data driver. The data driver may provide data voltages to the pixels disposed in the first and second display areas, and provide compensated data voltages to the pixels disposed in the first display area when a data compensation signal is received from the high frequency data compensator.

The high frequency data compensator may include a second memory, a second calculator, and a second compensation signal generator. The second memory may store gray level sections, each of which includes a low gray level range, a compensation decision value, and a gray level compensation value, and section groups including the gray level sections. The second calculator may select one section group among the section groups based on information on the selected DBV data, and measure pixel data for which gray levels are to be compensated among pixel data corresponding to the first display area and included in the image data based on the low gray level range, the compensation decision value, and the gray level compensation value, which correspond to each of the gray level sections included in the selected section group. The second compensation signal generator may generate the data compensation signal, and provide the data compensation signal to the data driver.

The low frequency offset compensator may determine whether pixel data corresponding to an index pixel group corresponding to at least four inconsecutive pixels selected from pixels disposed in a pixel row among the pixels disposed in the second display area is within a low gray level range.

When the pixel data corresponding to the index pixel group within the low gray level range is greater than or equal to a preset criterion, the low frequency offset compensator may apply the offset to the second initialization voltage.

The low frequency offset compensator may determine whether pixel data corresponding to a window index pixel corresponding to at least four consecutive pixels selected from pixels disposed in a pixel row among the pixels disposed in the second display area is within a low gray level range.

When the pixel data corresponding to the window index pixel within the low gray level range is greater than or equal to a preset criterion, the low frequency offset compensator may apply the offset to the second initialization voltage.

Each of the pixels may include a light emitting element, a driving transistor, and a first switching transistor. The light emitting element may output a light based on a driving current, and include a first terminal and a second terminal. The driving transistor may generate the driving current, and include a first terminal to which a first power supply voltage is applied, a second terminal connected to the first terminal of the light emitting element, and a gate terminal to which the first initialization voltage is selectively applied. The first switching transistor may include a first terminal to which the second initialization voltage is applied, a second terminal connected to the first terminal of the light emitting element, and a gate terminal to which a data write gate signal is applied. The first switching transistor may initialize the first terminal of the light emitting element to the second initialization voltage during an activation period of the data write gate signal.

Each of the pixels may further include a second switching transistor. The second switching transistor may include a first terminal to which the first initialization voltage is applied, a second terminal connected to the gate terminal of the driving transistor, and a gate terminal to which a data initialization gate signal is applied. The second switching transistor may initialize the gate terminal of the driving transistor to the first initialization voltage during an activation period of the data initialization gate signal.

Each of the pixels may further include a third switching transistor. The third switching transistor may include a first terminal to which a data voltage, a compensated data voltage, or a bias power supply voltage is applied, a second terminal connected to the first terminal of the driving transistor, and a gate terminal to which the data write gate signal is applied. When the offset is applied to the second initialization voltage, the compensated data voltage may be applied to a first terminal of a third switching transistor included in some pixels among the pixels disposed in the first display area, the data voltage may be applied to a first terminal of a third switching transistor included in remaining pixels among the pixels disposed in the first display area, and the bias power supply voltage may be applied to a first terminal of a third switching transistor included in each of the pixels disposed in the second display area.

The second initialization voltage to which the offset is applied may be provided to the pixels disposed in the first and second display areas.

According to embodiments, a method of driving a display device is provided as follows. It is determined whether to perform multi-frequency driving (MFD) based on image data. A low gray level range of display brightness value (DBV) data corresponding to a brightness of a display panel among DBV data is determined. It is determined whether pixel data of a low frequency area is within a preset low gray level range. A number of pixel data within the low gray level range is measured. It is determined whether a number of low gray level pixel data of frame data corresponding to the low frequency area is greater than or equal to a preset number. An offset to a second initialization voltage is applied in the low frequency area and a high frequency area when the number of the low gray level pixel data of the frame data corresponding to the low frequency area is greater than or equal to the preset number. One section group among section groups based on information on selected DBV data is selected. Pixel data for which gray levels are to be compensated among pixel data of frame data corresponding to the high frequency area based on a low gray level range, a compensation decision value, and a gray level compensation value, which correspond to each of gray level sections included in the selected section group are measured.

The preset low gray level range may be about 0.2 nits to about 1 nit, and the second initialization voltage to which the offset is applied may be supplied to the low frequency area and the high frequency area.

The method may further include determining whether pixel data corresponding to an index pixel is within the low gray level range, determining whether the pixel data corresponding to the index pixel is greater than or equal to a preset criterion, determining whether pixel data corresponding to a window index pixel is within the low gray level range, and determining whether the pixel data corresponding to the window index pixel is consecutive.

The method of claim may further include maintaining the second initialization voltage in the low frequency area and the high frequency area when the number of the low gray level pixel data of the frame data corresponding to the low frequency area is less than or equal to the preset number.

An embodiment may be related to a display device. The display device may include a display panel, a power supply unit, a voltage adjustment signal provider, and a data adjustment signal provider. The display panel may include a first display area and a second display area each including pixels. The power supply unit may provide a first initialization voltage and a second initialization voltage to the display panel. The voltage adjustment signal provider may provide a voltage adjustment signal to the power supply unit for applying an adjustment voltage to the second initialization voltage when the second display area is driven at a frequency lower than at least one of a predetermined frequency and a driving frequency of the first area. The data adjustment signal provider may provide a data adjustment signal for adjusting gray levels of some pixels included in the first display area when the adjustment voltage is applied to the second initialization voltage.

The voltage adjustment signal provider may determine a number of pixel data values within a preset gray level range based on gray level information of pixel data corresponding to the second display area and included in image data.

When the number of the pixel data values within the preset gray level range is greater than or equal to a preset number, the voltage adjustment signal provider may apply the adjustment voltage to the second initialization voltage.

When the number of the pixel data values within the preset gray level range is less than a preset criterion, the voltage adjustment signal provider may not apply the adjustment voltage to the second initialization voltage.

The preset gray level range may be from 0.2 nits to 1 nit.

The voltage adjustment signal provider may include the following elements: a first memory storing display brightness values and a gray level range corresponding to each of the display brightness values; a first calculator configured to determine whether the second display area is driven below at least one of the predetermined frequency and the driving frequency of the first area based on the image data, configured to select a selected display brightness value corresponding to a brightness level of the display panel, and configured to determine a selected gray level range of the selected display brightness value; and a first adjustment signal generator configured to generate the adjustment signal, and configured to provide the voltage adjustment signal to the power supply unit.

The display device may include a data driver configured to provide data voltages to the display panel, and configured to provide adjusted data voltages to pixels included in the first display area when the data adjustment signal is received from the data adjustment signal provider.

The data adjustment signal provider may include: a second memory storing gray level sections, each of which may include a gray level range, an adjustment decision value, and a gray level adjustment value, and storing section groups of the gray level sections; a second calculator configured to select one section group among the section groups based on information on the selected display brightness value, and configured to determine pixel data for which gray levels may be to be adjusted among pixel data corresponding to the first display area and included in the image data based on the selected gray level range, the adjustment decision value, and the gray level adjustment value; and a second adjustment signal generator configured to generate the data adjustment signal, and configured to provide the data adjustment signal to the data driver.

The voltage adjustment signal provider may determine whether pixel data values corresponding to an index pixel group including at least four inconsecutive pixels selected from pixels disposed in a pixel row among pixels included in the second display area are within a predetermined gray level range.

When a quantity of the pixel data values corresponding to the index pixel group within the predetermined gray level range is greater than or equal to a preset criterion, the voltage adjustment signal provider may provide the voltage adjustment signal to the power supply unit.

The voltage adjustment signal provider may determine whether pixel data values corresponding to a window index pixel group including at least four consecutive pixels selected from pixels disposed in a pixel row among pixels included in the second display area are within a predetermined gray level range.

When a quantity of the pixel data values corresponding to the window index pixel group within the gray level range is greater than or equal to a preset criterion, the voltage adjustment signal provider may provide the voltage adjustment signal to the power supply unit.

Each of the pixels may include the following elements: a light emitting element configured to output a light based on a driving current, and including a first terminal and a second terminal; a driving transistor configured to generate the driving current, and including a first terminal configured to receive a first power supply voltage, a second terminal electrically connected to the first terminal of the light emitting element, and a gate terminal configured to receive the first initialization voltage; and a first switching transistor including a first terminal configured to receive the second initialization voltage, a second terminal electrically connected to the first terminal of the light emitting element, and a gate terminal to configured to receive a data write gate signal. The first switching transistor may initialize the first terminal of the light emitting element to the second initialization voltage during an activation period of the data write gate signal.

Each of the pixels further may include a second switching transistor including a first terminal configured to receive the first initialization voltage, a second terminal electrically connected to the gate terminal of the driving transistor, and a gate terminal configured to receive a data initialization gate signal. The second switching transistor may initialize the gate terminal of the driving transistor to the first initialization voltage during an activation period of the data initialization gate signal.

Each of the pixels further may include a third switching transistor including a first terminal configured to receive a data voltage, an adjusted data voltage, or a bias power supply voltage, a second terminal connected to the first terminal of the driving transistor, and a gate terminal configured to receive the data write gate signal. When the adjustment voltage may be applied to the second initialization voltage, the adjusted data voltage may be applied to the first terminal of the third switching transistor included in each of some pixels included in the first display area, the data voltage may be applied to the first terminal of the third switching transistor included in each remaining pixel included in the first display area, and the bias power supply voltage may be applied to the first terminal of the third switching transistor included in each of the pixels included in the second display area.

The second initialization voltage may be adjusted by the adjustment voltage and may be provided to each of the first display area and the second display area.

An embodiment may be related to a method of driving a display device. The display device may include a first area and a second area. The method may include the following steps: determining whether to perform multi-frequency driving based on image data; determining a determined gray level range of a display brightness value corresponding to a brightness level of a display panel; determining whether pixel data of the second area is within a preset gray level range, a driving frequency of the second area being lower than at least one of a predetermined frequency and a driving frequency of the first area; determining a number of pixel data values within the preset gray level range; determining whether a number of gray level pixel data values of frame data corresponding to the second area is greater than or equal to a preset number; applying an adjustment voltage to a second initialization voltage in each of the second area and the first area when the number of the gray level pixel data values of the frame data corresponding to the second area is greater than or equal to the preset number; selecting a selected section group among section groups based on a selected display brightness value; and determining pixel data for which gray levels are to be adjusted among pixel data of frame data corresponding to the first area based on a selected gray level range, an adjustment decision value, and a gray level adjustment value that correspond to each of gray level sections included in the selected section group.

The preset gray level range may be from 0.2 nits to 1 nit.

The method may include the following steps: determining whether pixel data values corresponding to an index pixel group are within the determined gray level range, the index pixel group including inconsecutive pixels; determining whether a quantity of pixel data values corresponding to the index pixel group and being within the determined gray level range is greater than or equal to a first preset criterion; determining whether pixel data values corresponding to a window index pixel group are within the determined gray level range, the window index pixel group including consecutive pixels; and determining a quantity pixel data values corresponding to the window index pixel group and being within the determined gray level range is greater than or equal to a second preset criterion.

The method may include maintaining the second initialization voltage in the second area and the first area without applying the adjustment voltage when the number of the gray level pixel data values of the frame data corresponding to the second area may be less than the preset number.

According to embodiments, the display device includes the low frequency offset compensator (or voltage adjustment signal provider) and the high frequency data compensator (or data adjustment signal provider), so that when the second display area of the display panel is driven at a low frequency, the offset (voltage adjustment signal) may be selectively applied to the second initialization voltage so as to prevent a luminance deviation from occurring in the pixels disposed in the second display area, and even when the offset is applied to the second initialization voltage that is to be provided to the pixels disposed in the first display area, the high frequency data compensator may compensate for deviations of gray levels of some pixel data among the pixel data corresponding to the first display area so as to prevent a luminance deviation from occurring in the pixels disposed in the first display area.

Because the display device may selectively apply the offset to the second initialization voltage, the power consumption of the display device may be reduced.

When frame data in which the brightness of the display panel exceeds about 1 nit includes a low-luminance pattern, the display device may apply the offset to the second initialization voltage so as to reduce a luminance deviation that may occur in the pixels of the display panel.

BRIEF DESCRIPTION OF THE DRAWINGS

FIG. 13, FIG. 14, FIG. 15, FIG. 16, FIG. 17, FIG. 18, FIG. 19, and FIG. 20 are views for describing the method of driving the display device described with reference to FIG. 12*a* and FIG. 12*b* according to embodiments.

DETAILED DESCRIPTION OF EMBODIMENTS

Figure 1:
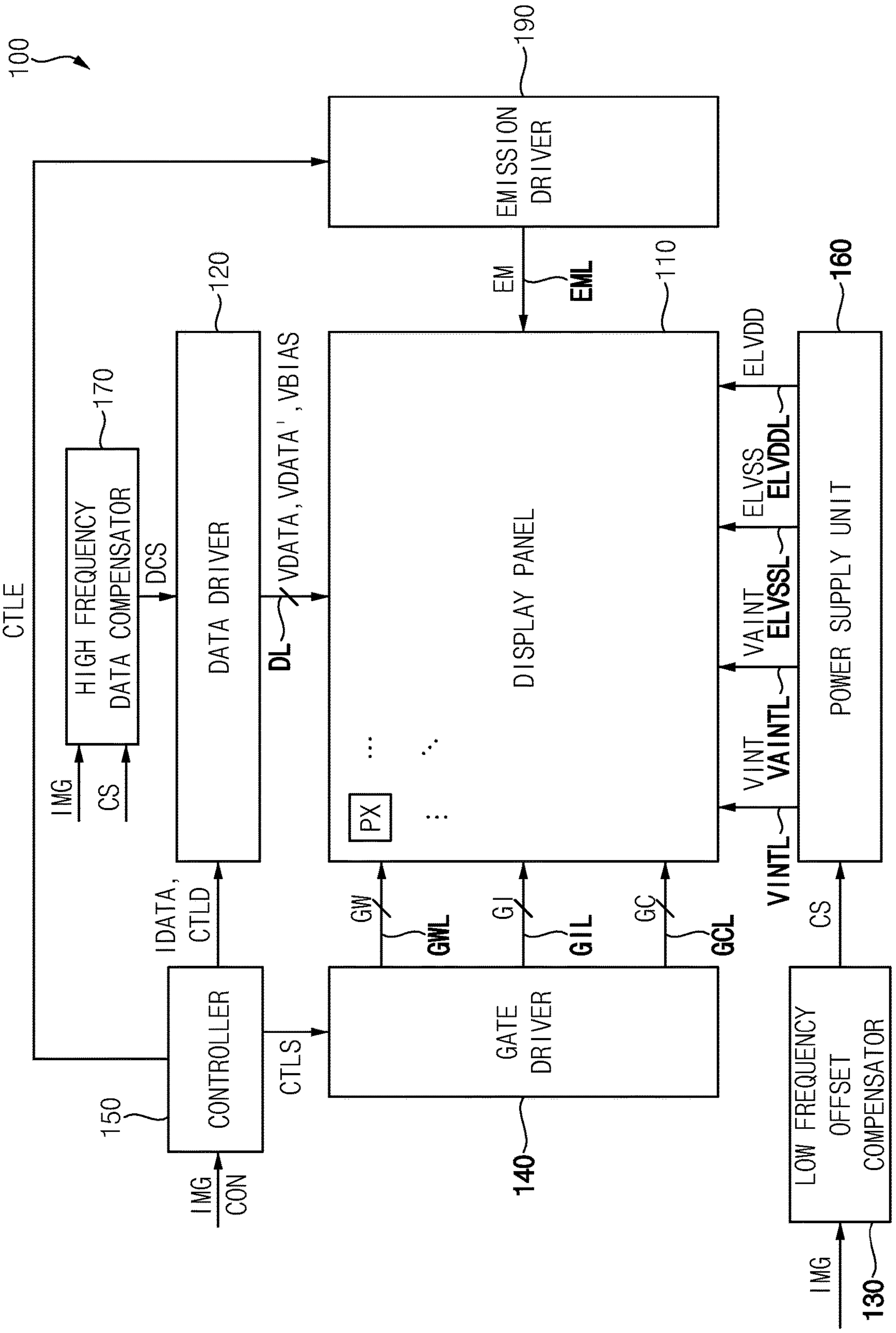
FIG. 1 is a block diagram showing a display device according to embodiments.

Examples of embodiments are described with reference to the accompanying drawings. In the accompanying drawings, same or similar reference numerals/characters may refer to the same or similar elements.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "include" may mean "be made of" The term "adjacent" may mean "immediately adjacent." The term "compensate for" may mean "compensate for deviation of" or "adjust." The term "compensation" may mean "adjustment." The term "offset" may mean "adjust" or "adjustment." The term "measure" may mean "determine." The term "terminate" may mean "end" or "stop." The term "data" may mean "data values" or "data value." The term "count" may mean "determine."

Figure 2:
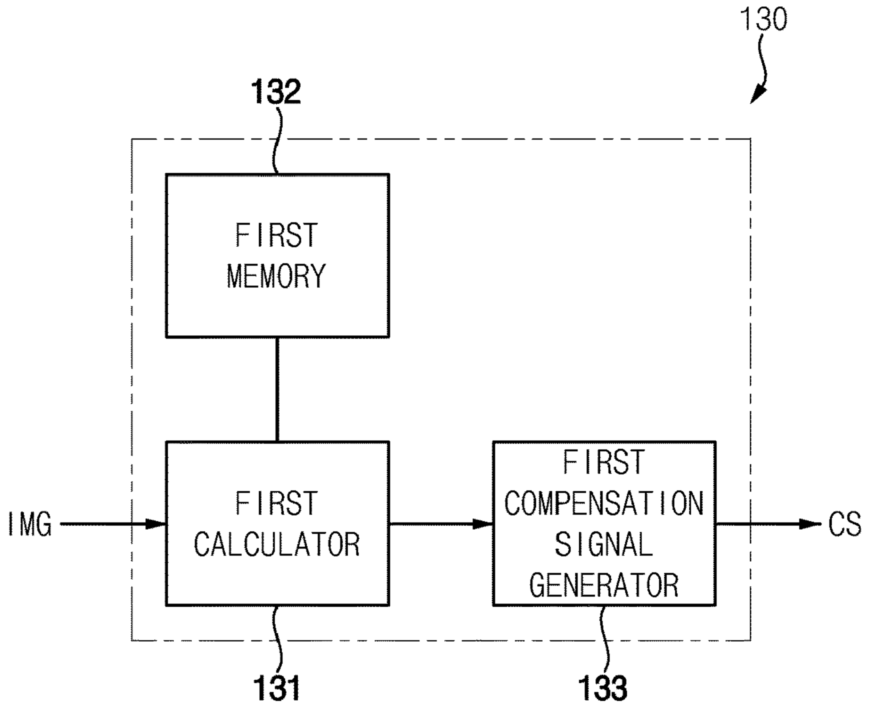
FIG. 2 is a block diagram for describing a low frequency offset compensator included in the display device of FIG. 1 according to embodiments.
Figure 3:
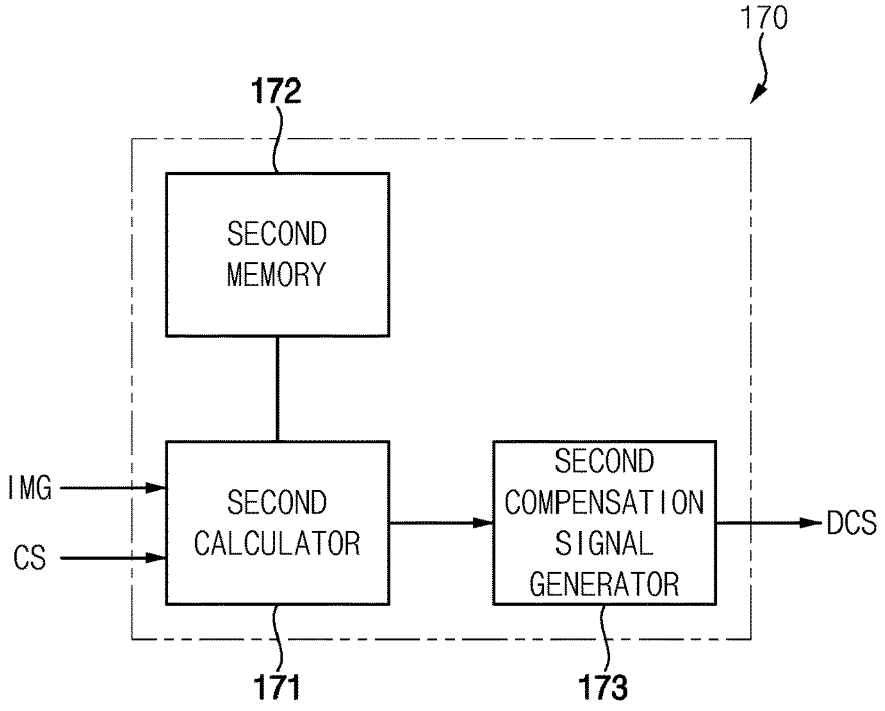
FIG. 3 is a block diagram for describing a high frequency data compensator included in the display device of FIG. 1 according to embodiments.
Figure 4:
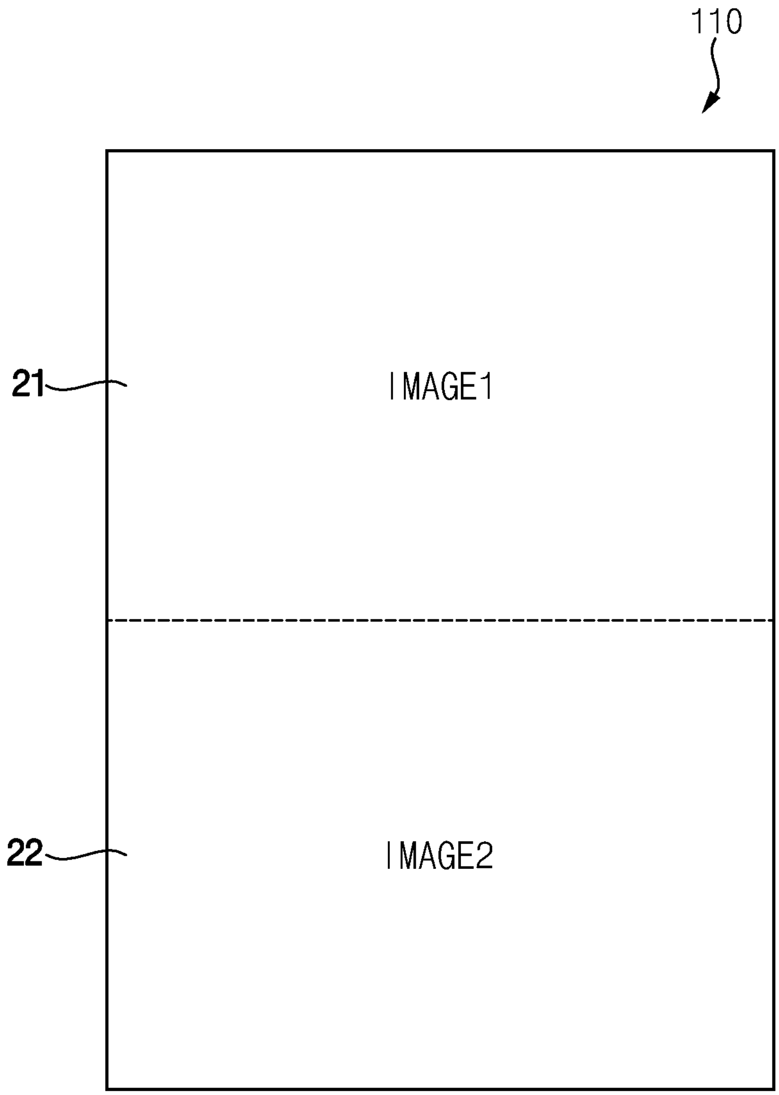
FIG. 4 is a block diagram showing a display panel included in the display device of FIG. 1 according to embodiments.

FIG. 1 is a block diagram showing a display device according to embodiments. FIG. 2 is a block diagram for describing a low frequency offset compensator included in the display device of FIG. 1. FIG. 3 is a block diagram for describing a high frequency data compensator included in the display device of FIG. 1. FIG. 4 is a block diagram showing a display panel included in the display device of FIG. 1.

Referring to FIGS. 1, 2, 3, and 4, a display device 100 may include a display panel 110 including a plurality of pixels PX, a controller 150, a data driver 120, a gate driver 140, an emission driver 190, a power supply unit 160, a low frequency offset compensator 130 (or low-frequency-mode voltage adjustment signal provider 130), a high frequency data compensator 170 (or high-frequency-mode data adjustment signal provider 170), and the like. The low frequency offset compensator 130 may include a first calculator 131, a first memory 132, and a first compensation signal generator 133. The high frequency data compensator 170 may include a second calculator 171, a second memory 172, and a second compensation signal generator 173.

The display device 100 may display images at different driving frequencies (or image refresh rates or screen refresh rates) according to driving conditions. A display area of the display device 100 may be driven at a low frequency, and the display area of the display device 100 may be driven at a high frequency. Two display areas may be simultaneously driven at a low frequency and a high frequency, respectively.

The display panel 110 may include a plurality of data lines DL, a plurality of data write gate lines GWL, a plurality of data initialization gate lines GIL, a plurality of compensation gate lines GCL, a plurality of emission lines EML, a plurality of first power supply voltage lines ELVDDL, a plurality of second power supply voltage lines ELVSSL, a plurality of first initialization voltage lines VINTL, a plurality of second initialization voltage lines VAINTL, and a plurality of pixels PX connected to the lines.

Each of the pixels PX may include at least two transistors, at least one capacitor, and a light emitting element. The display panel 110 may be a light emitting display panel. The display panel 110 may be included in an organic light emitting display device (OLED). The display panel 110 may be included in an inorganic light emitting display device (ILED), a quantum dot display device (QDD), a liquid crystal display device (LCD), a field emission display device (FED), a plasma display device (PDP), or an electrophoretic display device (EPD).

The controller 150 (e.g., a timing controller (T-CON)) may receive image data IMG and an input control signal CON from an external host processor (e.g., an application processor (AP), a graphic processing unit (GPU), or a graphic card). The image data IMG may be RGB image data (or RGB pixel data) including red image data (or red pixel data), green image data (or green pixel data), and blue image data (or blue pixel data). The image data IMG may include information on a driving frequency. The control signal CON may include a vertical synchronization signal, a horizontal synchronization signal, an input data enable signal, a master clock signal, and the like.

The controller 150 may convert the image data IMG into input image data IDATA by applying an algorithm (e.g., dynamic capacitance compensation (DCC), etc.) for correcting image quality related to the image data IMG supplied from an external host processor. The controller 150 may not include an algorithm for improving image quality, and the image data IMG may be output as the input image data IDATA. The controller 150 may supply the input image data IDATA to the data driver 120.

The controller 150 may generate a data control signal CTLD for controlling an operation of the data driver 120, a gate control signal CTLS for controlling an operation of the gate driver 140, and an emission control signal CTLE for controlling an operation of the emission driver 190 based on the input control signal CON. The gate control signal CTLS may include a vertical start signal, gate clock signals, and the like. The data control signal CTLD may include a horizontal start signal, a data clock signal, and the like.

The gate driver 140 may generate data write gate signals GW, data initialization gate signals GI, and compensation gate signals GC based on the gate control signal CTLS received from the controller 150. The gate driver 140 may output the data write gate signals GW, the data initialization gate signals GI, and the compensation gate signals GC to the pixels PX through the data write gate lines GWL, the data initialization gate lines GIL, and the compensation gate lines GCL.

The emission driver 190 may generate emission signals EM based on the emission control signal CTLE received from the controller 150. The emission driver 190 may output the emission signals EM to the pixels PX connected to the emission lines EML.

The power supply unit 160 may generate a first initialization voltage VINT, a second initialization voltage VAINT, a first power supply voltage ELVDD, and a second power supply voltage ELVSS, and may provide the first initialization voltage VINT, the second initialization voltage VAINT, the first power supply voltage ELVDD, and the second power supply voltage ELVSS to the pixels PX through the first initialization voltage line VINTL, the second initialization voltage line VAINTL, the first power supply voltage line ELVDDL, and the second power supply voltage line ELVSSL. The power supply unit 160 may receive a compensation signal CS (or voltage adjustment signal CS) from the low frequency offset compensator 130 to apply an offset (or adjustment voltage) to the second initialization voltage VAINT.

The data driver 120 may receive the data control signal CTLD and input image data IDATA from the controller 150. The data driver 120 may receive a data compensation signal DCS (or data adjustment signal DCS) from the high frequency data compensator 170 to compensate for (or adjust) a gray level of compensated pixel data among pixel data included in the input image data IDATA. The data driver 120 may convert digital input image data IDATA into an analog data voltage using a gamma reference voltage generated by a gamma reference voltage generator (not shown). The analog data voltage obtained by the conversion will be defined as a data voltage VDATA. When the data compensation signal DCS is received to compensate for a gray level of specific data in the input image data IDATA, the analog data voltage obtained by the conversion will be defined as a compensated data voltage VDATA' (or adjusted data voltage VDATA'). The data driver 120 may output data voltages VDATA and/or compensated data voltages VDATA' to the pixels PX through the data lines DL based on the data control signal CTLD. The data driver 120 may generate a bias power supply voltage VBIAS, and may output the bias power supply voltage VBIAS to the pixels PX through the data lines DL. The data driver 120 and the controller 150 may be implemented as a single integrated circuit, and the integrated circuit may be referred to as a timing controller-embedded data driver (TED).

Referring again to FIG. 4, the display panel 110 may perform multi-frequency driving (MFD) (hereinafter referred to as "MFD"). The display panel 110 may include a first display area 21 and a second display area 22, and an image may be displayed on the first display area 21 and the second display area 22. The first display area 21 (or a high frequency area) of the display panel 110 may be driven at a high frequency (higher than a predetermined frequency) and may display a first image/portion IMAGE1 of the image. The second display area 22 (or a low frequency area) of the display panel 110 may be driven at a low frequency (lower than a predetermined frequency) and may display a second image/portion IMAGE2 of the image. The low frequency offset compensator 130 may determine whether to apply the offset to the second initialization voltage VAINT based on the image data IMG to be provided to the pixels PX disposed in the second display area 22. When the low frequency offset compensator 130 applies the offset to the second initialization voltage VAINT, the offset may be applied to the second initialization voltage VAINT to be provided to the pixels PX disposed in the first display area 21 and the second display area 22. The offset may be applied to the second initialization voltage VAINT to be provided to the pixels PX disposed in the second display area 22 so as to reduce a luminance deviation of the pixels PX disposed in the second display area 22. The offset may also be applied to the second initialization voltage VAINT to be provided to the pixels PX disposed in the first display area 21; luminance deviation may occur in the pixels PX disposed in the first display area 21 if not adjustment is implemented.

The low frequency offset compensator 130 may determine whether the display panel 110 included in the display device 100 performs the MFD. When the low frequency offset compensator 130 determines a region driven at a low frequency (e.g., the second display area 22) in the MFD, the low frequency offset compensator 130 may determine whether to apply the offset to the second initialization voltage VAINT. In order to determine whether to apply the offset to the second initialization voltage VAINT, the low frequency offset compensator 130 may receive the image data IMG, and receive driving frequency information and image data information (or pixel data information) from the image data IMG. The first calculator 131 may determine whether the second display area 22 of the display panel 110 (or the display device 100) is driven at a low frequency based on the image data IMG. When the second display area 22 of the display panel 110 is driven at the low frequency, the first calculator 131 may select display brightness value (DBV) (hereinafter referred to as "DBV") data corresponding to a current brightness of the display panel (or display device) among DBV data stored in the first memory 132, and may determine a low gray level range of the selected DBV data. The low gray level range will be from a lowest gray level value when a brightness of the display panel 110 is about 0.2 nits to a highest gray level value when the brightness of the display panel 110 is about 1 nit.

The DBV data may be a luminance value of a light (e.g., a white light) emitted from the pixels PX that corresponds to a maximum gray level by the display panel 110, in which a unit of a luminance is nit. An overall brightness of the display panel 110 may vary according to a setting by a user of the display device 100. The DBV data may include first to $n^{th}$ DBV data (where n is an integer that is greater than or equal to 2). When the display panel 110 is implemented with 0 to 255 gray levels, the first DBV data may signify that the display panel 110 emits a light with 255 gray levels and a brightness of about 2 nits (e.g., a lowest luminance DBV), and the low gray level may be in a range from 90 (i.e., a lowest gray level) to 187 (i.e., a highest gray level). When the display panel 110 is implemented with 0 to 255 gray levels, the $n^{th}$ DBV data may signify that the display panel 110 emits a light with 255 gray levels and a brightness of about 1000 nits (e.g., a highest luminance DBV), and the low gray level may be in a range from 6 (i.e., the lowest gray level) to 11 (i.e., the highest gray level). The low gray level range may be a criterion for applying the offset to the second initialization voltage VAINT when the display panel 110 is driven at the low frequency. Since it has been experimentally found that a luminance deviation occurs in a pixel PX when the offset of the second initialization voltage VAINT is applied to pixel data exceeding about 1 nit, the offset of the second initialization voltage VAINT may be applied to pixel data between about 0.2 nits and about 1 nit.

The low gray level range may be between about 0.2 nits and about 1 nit. The low gray level range may be determined according to a type of the display panel 110.

After the low gray level range of the selected DBV data is determined, the first calculator 131 may determine whether the pixel data is within a preset low gray level range based on gray level information included in the pixel data corresponding to the second display area 22. The pixel data may include pixel data values corresponding to pixels arranged in one pixel row in the second display area 22, respectively. For example, when 1440 pixels are arranged in a row direction of the display panel 110, pixel data corresponding to a first pixel row may include first to 1440th pixel data values, and pixel data corresponding to an $m^{th}$ pixel row may also include first to 1440th pixel data values. Pixel data corresponding to first to $m^{th}$ pixel rows may be defined as frame data. For example, first to $(i-1)^{th}$ pixel rows among the first to $m^{th}$ pixel rows may correspond to the first display area 21, and $i^{th}$ to $m^{th}$ pixel rows among the first to $m^{th}$ pixel rows may correspond to the second display area 22 (where m is an integer that is greater than or equal to 4, and i is an integer between 1 and m).

After the first calculator 131 determines whether each of the pixel data values is within the preset low gray level range, the first calculator 131 may measure/determine a number of pixel data values within the low gray level range with respect to the pixel data corresponding to pixel rows (e.g., the $i^{th}$ to $m^{th}$ pixel rows) located in the second display area 22 among the first to $m^{th}$ pixel rows.

After the measurement/determination of the number of the pixel data within the low gray level range with respect to the frame data corresponding to the second display area 22 ends, the first calculator 131 may determine whether a total number of the pixel data values within the low gray level range with respect to the frame data corresponding to the second display area 22 is greater than or equal to a preset number.

When the total number of the pixel data values within the low gray level range with respect to the frame data corresponding to the second display area 22 is greater than or equal to the preset number, the first calculator 131 may determine that an offset has to be applied to the second initialization voltage VAINT, and the first compensation signal generator 133 may generate the compensation signal CS to provide the generated compensation signal CS to the power supply unit 160. The power supply unit 160 may receive the compensation signal CS from the low frequency offset compensator 130 to provide the second initialization voltage VAINT (to which the offset is applied) to the pixels PX disposed in the first display area 21 and the second display area 22. The offset may be applied to the second initialization voltage VAINT to be provided to the pixels PX disposed in the second display area 22 so as to reduce the luminance deviation of the pixels PX disposed in the second display area 22. The offset may also be applied to the second initialization voltage VAINT to be provided to the pixels PX disposed in the first display area 21; luminance deviation may occur in the pixels PX disposed in the first display area 21 if not adjustment is implemented.

In addition, after the low gray level range of the selected DBV data is determined, the first calculator 131 may determine whether pixel data corresponding to an index pixel (or an index pixel group) is within the low gray level range. The index pixel may correspond to four pixels selected among pixels overlapping at least four regions selected from each preset pixel row among the pixel rows located in the second display area 22. For example, four pixels selected from one region may be inconsecutive, and 16 pixels may be selected from one pixel row.

A number of preset pixel rows, a number of regions selected from each preset pixel row, and a number of pixels overlapping each of the selected regions may be determined according to embodiments. The four pixels selected from the one region may be consecutive.

When the number of the pixel data within the low gray level range with respect to the frame data corresponding to the second display area 22 is less than or equal to the preset number, the first calculator 131 may determine that it is unnecessary to apply the offset to the second initialization voltage VAINT with respect to the frame data corresponding to the second display area 22. However, even when the number of the pixel data within the low gray level range with respect to the frame data corresponding to the second display area 22 is less than or equal to the preset number, when pixels corresponding to the pixel data within the low gray level range are clustered in a preset region, a luminance decrease or a luminance increase (i.e., the luminance deviation) may be visually recognized in the clustered pixels (e.g., a low-luminance pattern). Therefore, the first calculator 131 may determine whether the pixel data corresponding to the index pixel is within the low gray level range, and when the pixel data corresponding to the index pixel within the low gray level range is greater than or equal to a preset criterion, the first calculator 131 may determine that the offset has to be applied to the second initialization voltage VAINT, and the first compensation signal generator 133 may generate the compensation signal CS to provide the generated compensation signal CS to the power supply unit 160.

After determining whether the pixel data corresponding to the index pixel is within the low gray level range, the first calculator 131 may determine whether pixel data corresponding to a window index pixel is within the low gray level range. The window index pixel may correspond to pixels located in a preset region set in each of the pixel rows located in the second display area 22. The window index pixel may include at least four pixels that are adjacent to each other in the row direction in each the pixel rows located in the second display area 22, and the window index pixel may be located in a preset region having a rectangular shape.

When the number of the pixel data within the low gray level range with respect to the frame data corresponding to the second display area 22 is less than or equal to the preset number, the first calculator 131 may determine that it is unnecessary to apply the offset to the second initialization voltage VAINT with respect to the frame data corresponding to the second display area 22. However, even when the number of the pixel data within the low gray level range with respect to the frame data corresponding to the second display area 22 is less than or equal to the preset number, when pixels corresponding to the pixel data within the low gray level range are consecutively located (e.g., in the low-luminance pattern) in a preset region of adjacent pixel rows among the pixel rows located in the second display area 22, the luminance deviation may be visually recognized in the pixels located in the preset region of the adjacent pixel rows. Therefore, the first calculator 131 may determine whether the pixel data corresponding to the window index pixel is within the low gray level range, and when the pixel data corresponding to the window index pixel within the low gray level range is greater than or equal to a preset criterion, the first calculator 131 may determine that the offset has to be applied to the second initialization voltage VAINT, and the first compensation signal generator 133 may generate the compensation signal CS to provide the generated compensation signal CS to the power supply unit 160. In some embodiments, the low frequency offset compensator 130 and the controller 150 may be implemented as a single integrated circuit.

When the first display area 21 of the display panel 110 is driven at a high frequency, the second display area 22 of the display panel 110 is driven at a low frequency. The low frequency offset compensator 130 provides the compensation signal CS to the power supply unit 160. The high frequency data compensator 170 may receive the compensation signal CS from the low frequency offset compensator 130, and may receive information on the selected DBV data from the compensation signal CS. The high frequency data compensator 170 may receive the image data IMG, and may receive the pixel data information from the image data IMG.

The second calculator 171 may determine pixel data corresponding to the first display area 21 of the display panel 110 based on the image data IMG. The second calculator 171 may select one section group among section groups including gray level sections stored in the second memory 172 based on the information on the selected DBV data. A low gray level range, a compensation decision value, and a gray level compensation value may be set in each of the gray level sections included in the selected section group.

The section groups may include first to $n^{th}$ section groups. The low gray level range of the first DBV data may be 90 to 187. The first section group may correspond to the first DBV data, and the first section group may include a first gray level section R1 to an $m^{th}$ gray level section Rm. In the first section group, a low gray level range of the first gray level section R1 may be 90 to 99, a compensation decision value of the first gray level section R1 may be 8, and a gray level compensation value of the first gray level section R1 may be −2. In the first section group, a low gray level range of the second gray level section R2 may be 100 to 109, a compensation decision value of the second gray level section R2 may be 7, and a gray level compensation value of the second gray level section R2 may be −2. In the first section group, a low gray level range of the $m^{th}$ gray level section Rm may be 180 to 187, a compensation decision value of the $m^{th}$ gray level section Rm may be 3, and a gray level compensation value of the $m^{th}$ gray level section Rm may be −1. The first to $m^{th}$ gray level sections R1 to Rm in which the low gray level range of the first DBV data is divided by a preset interval may be defined. The low gray level range of the $n^{th}$ DBV data may be 6 to 11. The $n^{th}$ section group may correspond to the $n^{th}$ DBV data, and the $n^{th}$ section group may include a first gray level section R1 and a second gray level section R2. In the $n^{th}$ section group, a low gray level range of the first gray level section R1 may be 6 to 8, a compensation decision value of the first gray level section R1 may be 2, and a gray level compensation value of the first gray level section R1 may be −1. In the $n^{th}$ section group, a low gray level range of the second gray level section R2 may be 9 to 11, a compensation decision value of the second gray level section R2 may be 3, and a gray level compensation value of the second gray level section R2 may be −1. The first and second gray level sections R1 and R2 in which the low gray level range of the $n^{th}$ DBV data is divided by a preset interval may be defined.

However, the preset interval for dividing the low gray level range, the compensation decision value, and the gray level compensation value may be determined according to the type of the display panel 110.

After the gray level sections of the selected section group are determined, the second calculator 171 may determine whether the pixel data corresponds within a low gray level range set for each of the gray level sections based on gray level information included in each of the pixel data values corresponding to the first display area 21. The pixel data values may respectively correspond to pixels disposed in one pixel row in the first display area 21.

After the second calculator 171 determines whether the pixel data is within the set low gray level range, the second calculator 171 may measure/determine a number of pixel data values within the low gray level range with respect to the pixel data corresponding to the pixel rows (e.g., the first to (i−1)th pixel rows) located in the first display area 21 among the first to $m^{th}$ pixel rows.

The second calculator 171 may detect pixel data corresponding to a compensation setting value set for each of the gray level sections in a process of measuring/determining the number of the pixel data value that are within the low gray level range. For example, when the compensation setting value is 8, the second calculator 171 may detect $(\text{multiples of } 8)^{th}$ (e.g., eighth, $16^{th}$, $24^{th}$ etc.) pixel data values among the measured/determined pixel data values in the process of measuring/determining the number of the pixel data values that are within the low gray level range.

After the second calculator 171 detects the pixel data corresponding to the compensation setting value set for each of the gray level sections, the second calculator 171 may determine that a gray level of the pixel data has to be compensated for. The second compensation signal generator 173 may generate the data compensation signal DCS including information (in which the gray level of the detected pixel data is compensated for) to provide the data compensation signal DCS to the data driver 120. The second calculator 171 may generate pixel data (for which the gray level of the detected pixel data is compensated) according to a gray level compensation value set for each of the gray level sections, and may provide the pixel data (compensated for according to the gray level compensation value) to the data driver 120 through the data compensation signal DCS. The data driver 120 may generate the compensated data voltage VDATA' (including the pixel data compensated for) according to the gray level compensation value. A gray level of the detected pixel data corresponding to the first gray level section R1 of the first section group may be decreased by 2, a gray level of the detected pixel data corresponding to the second gray level section R2 of the first section group may be decreased by 2, and a gray level of the detected pixel data corresponding to the $m^{th}$ gray level section Rm of the first section group may decrease by 1. A gray level of the detected pixel data corresponding to the first gray level section R1 of the $m^{th}$ section group may be decreased by 1, and a gray level of the detected pixel data corresponding to the second gray level section R2 of the $m^{th}$ section group may decrease by 1. The high frequency data compensator 170 and the data driver 120 may be implemented as a single integrated circuit.

The gray level compensation values in the gray level sections may be negative numbers or positive numbers, depending on the type of the display panel 110.

According to embodiments, the display device 100 includes the low frequency offset compensator 130 and the high frequency data compensator 170, so that when the second display area 22 of the display panel 110 is driven at a low frequency, the offset may be selectively applied to the second initialization voltage VAINT, so as to prevent a luminance deviation from occurring in the pixels PX disposed in the second display area 22. When the offset is applied to the second initialization voltage VAINT to be provided to the pixels PX disposed in the first display area 21, the high frequency data compensator 170 may compensate for gray levels of some pixel data among the pixel data corresponding to the first display area 21, so as to prevent a luminance deviation from occurring in the pixels PX disposed in the first display area 21.

The display device 100 may selectively apply the offset to the second initialization voltage VAINT, so that the power consumption of the display device 100 may be reduced.

When frame data in which the brightness of the display panel 110 exceeds about 1 nit includes a low-luminance pattern, the display device 100 may apply the offset to the second initialization voltage VAINT, so as to reduce a luminance deviation that may occur in the pixels PX of the display panel 110.

Figure 5:
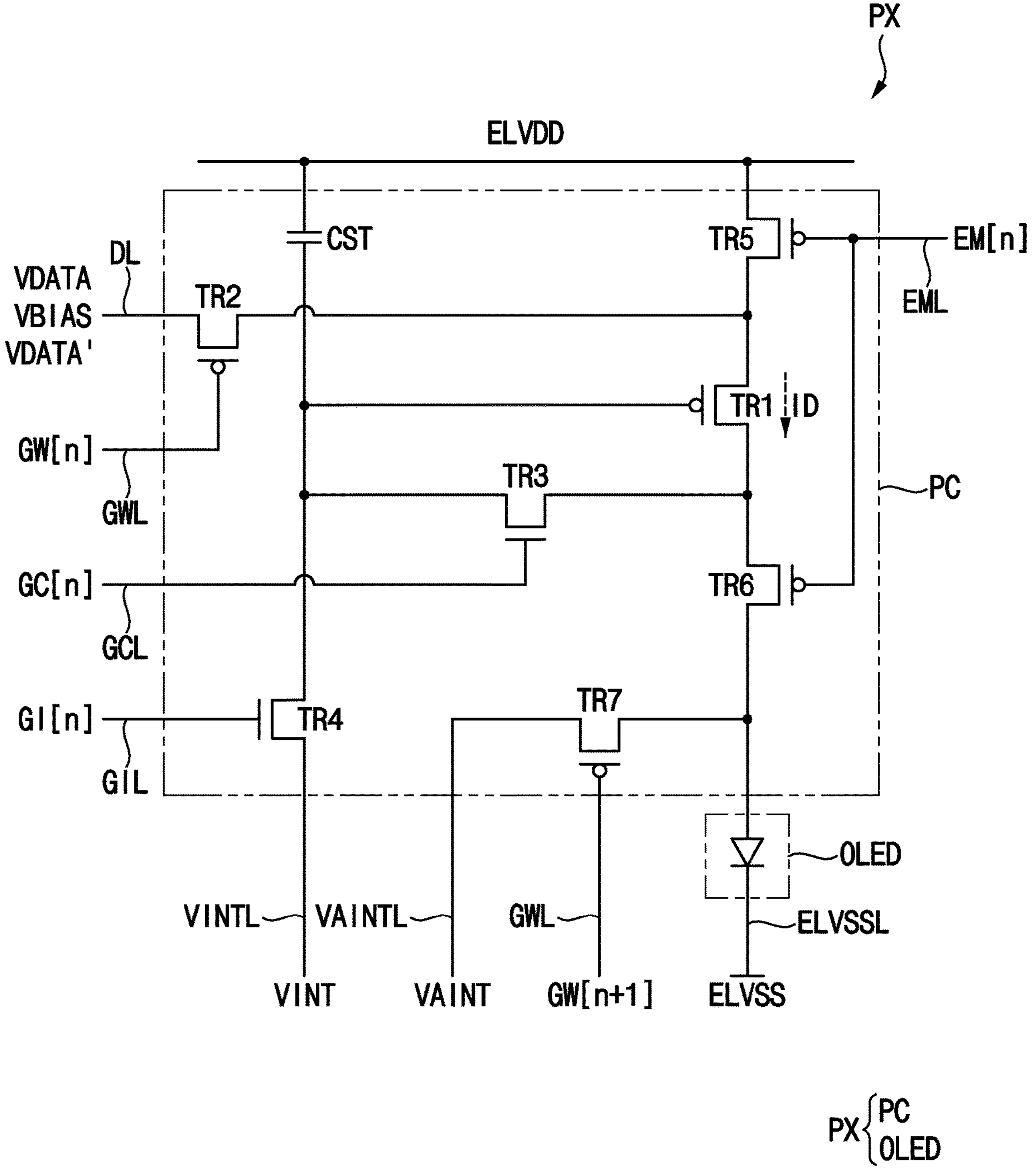
FIG. 5 is a circuit diagram showing a pixel included in the display device of FIG. 1 according to embodiments.
Figure 6:
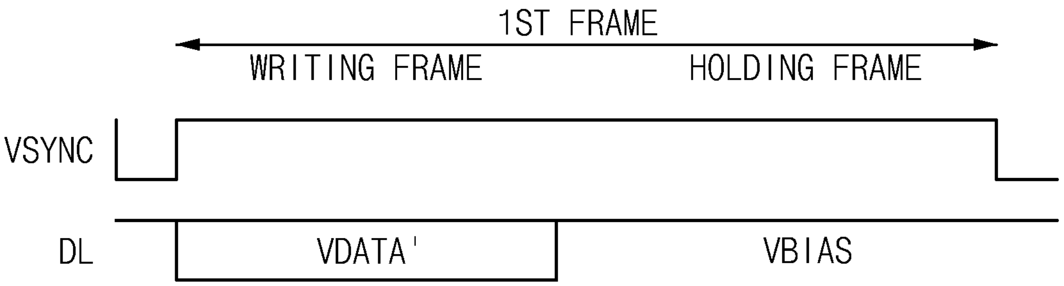
FIG. 6 is a timing diagram for describing a state in which a compensated data voltage and a bias power supply voltage are applied to a data line when a first display area of the display device of FIG. 1 is driven at a high frequency and a second display area of the display device of FIG. 1 is driven at a low frequency according to embodiments.

FIG. 5 is a circuit diagram showing a pixel included in the display device of FIG. 1 according to embodiments. FIG. 6 is a timing diagram for describing a state in which a compensated data voltage and a bias power supply voltage are applied to a data line when a first display area of the display device of FIG. 1 is driven at a high frequency and a second display area of the display device of FIG. 1 is driven at a low frequency according to embodiments.

Referring to FIGS. 5 and 6, the pixel PX may include a pixel circuit PC and an organic light emitting diode OLED. The pixel circuit PC may include first to seventh transistors TR1, TR2, TR3, TR4, TR5, TR6, and TR7, a storage capacitor CST, and the like. The pixel circuit PC and/or the organic light emitting diode OLED may be connected to the first power supply voltage line ELVDDL, the second power supply voltage line ELVSSL, the first initialization voltage line VINTL, the second initialization voltage line VAINTL, the data line DL, the data write gate line GWL, the data initialization gate line GIL, the compensation gate line GCL, the emission line EML, and the like. The first transistor TR1 may be a driving transistor. The second to seventh transistors TR2, TR3, TR4, TR5, TR6, and TR7 may be switching transistors. Each of the first to seventh transistors TR1, TR2, TR3, TR4, TR5, TR6, and TR7 may include a first terminal, a second terminal, and a gate terminal. The first terminal may be a source terminal, and the second terminal may be a drain terminal. The first terminal may be a drain terminal, and the second terminal may be a source terminal.

Each of the first, second, fifth, sixth, and seventh transistors TR1, TR2, TR5, TR6, and TR7 may be a PMOS transistor, and may have a channel including polysilicon. Each of the third and fourth transistors TR3 and TR4 may be an NMOS transistor, and may have a channel including a metal oxide semiconductor.

The organic light emitting diode OLED may output light based on a driving current ID. The organic light emitting diode OLED may include a first terminal and a second terminal. The first terminal of the organic light emitting diode OLED may receive the first power supply voltage ELVDD, and the second terminal of the organic light emitting diode OLED may receive the second power supply voltage ELVSS. The first power supply voltage ELVDD and the second power supply voltage ELVSS may be provided from the power supply unit 160 through the first power supply voltage line ELVDDL and the second power supply voltage line ELVSSL, respectively. The first terminal of the organic light emitting diode OLED may be an anode terminal, and the second terminal of the organic light emitting diode OLED may be a cathode terminal. The first terminal of the organic light emitting diode OLED may be a cathode terminal, and the second terminal of the organic light emitting diode OLED may be an anode terminal.

The first power supply voltage ELVDD may be applied to the first terminal of the first transistor TR1. The second terminal of the first transistor TR1 may be connected to the first terminal of the organic light emitting diode OLED. The first initialization voltage VINT may be applied to the gate terminal of the first transistor TR1. The first initialization voltage VINT may be provided from the power supply unit 160 through the first initialization voltage line VINTL.

The first transistor TR1 may generate the driving current ID. The first transistor TR1 may operate in a saturation region. The first transistor TR1 may generate the driving current ID based on a voltage difference between the gate terminal and the source terminal of the first transistor TR1. Gray levels may be expressed based on a magnitude of the driving current ID supplied to the organic light emitting diode OLED. The first transistor TR1 may operate in a linear region. The gray levels may be expressed based on a sum of a time during which the driving current is supplied to the organic light emitting diode OLED within one frame.

The gate terminal of the second transistor TR2 (e.g., a third switching transistor) may receive a data write gate signal GW[n]. The data write gate signal GW[n] may be provided from the gate driver 140 through the data write gate line GWL. The first terminal of the second transistor TR2 may receive the data voltage VDATA, the compensated data voltage VDATA', or the bias power supply voltage VBIAS.

The data voltage VDATA, the compensated data voltage VDATA', and the bias power supply voltage VBIAS may be provided from the data driver 120 through the data line DL. The second terminal of the second transistor TR2 may be connected to the first terminal of the first transistor TR1. When the first display area 21 of the display panel 110 is driven at a high frequency, and the second display area 22 of the display panel 110 is driven at a low frequency, referring to FIG. 6, the compensated data voltage VDATA' may be provided to the second transistor TR2 included in the pixel PX disposed in the first display area 21 in a writing frame of a first frame through the data line DL, the bias power supply voltage VBIAS may be provided to the second transistor TR2 included in the pixel PX disposed in the second display area 22 in a holding frame of the first frame through the data line DL. The compensated data voltage VDATA' (provided to the second transistor TR2 included in the pixel PX disposed in the first display area 21) and the bias power supply voltage VBIAS (provided to the second transistor TR2 included in the pixel PX disposed in the second display area 22) may be supplied to the source terminal of the first transistor TR1 during an activation period of the data write gate signal GW[n]. The second transistor TR2 may operate in a linear region.

Referring again to FIG. 5, the gate terminal of the third transistor TR3 may receive a compensation gate signal GC[n]. The compensation gate signal GC[n] may be provided from the gate driver 140 through the compensation gate line GCL. The first terminal of the third transistor TR3 may be connected to the gate terminal of the first transistor TR1. The second terminal of the third transistor TR3 may be connected to the second terminal of the first transistor TR1. The third transistor TR3 may be connected between the gate terminal of the first transistor TR1 and the second terminal of the first transistor TR1.

The third transistor TR3 may connect the gate terminal of the first transistor TR1 to the second terminal of the first transistor TR1 during an activation period of the compensation gate signal GC[n]. The third transistor TR3 may operate in a linear region. That is, the third transistor TR3 may diode-connect the first transistor TR1 during the activation period of the compensation gate signal GC[n]. The third transistor TR3 may diode-connect the first transistor TR1 in response to the compensation gate signal GC[n]. Since the first transistor TR1 is diode-connected, a voltage difference corresponding to a threshold voltage of the first transistor TR1 may occur between the first terminal of the first transistor TR1 and the gate terminal of the first transistor TR1. The threshold voltage may have a negative value. As a result, a voltage obtained by summing up the data voltage VDATA supplied to the first terminal of the first transistor TR1 and the voltage difference (i.e., the threshold voltage) may be supplied to the gate terminal of the first transistor TR1 during the activation period of the data write gate signal GW[n]. The data voltage VDATA may be compensated for by the threshold voltage of the first transistor TR1, and the compensated data voltage VDATA' may be supplied to the gate terminal of the first transistor TR1.

The third transistor TR3 may include an NMOS transistor. The leakage current of an NMOS transistor may be less than the leakage current of a PMOS transistor. When the leakage current is generated in the third transistor TR3, a voltage of the gate terminal of the first transistor TR1 may be increased, and the driving current ID may be decreased, so that a luminance may be decreased. In order to reduce the leakage current of the third transistor TR3 in a high gray level, the third transistor TR3 may be/include an NMOS transistor.

The gate terminal of the fourth transistor TR4 (e.g., a second switching transistor) may receive a data initialization gate signal GI[n]. The data initialization gate signal GI[n] may be provided from the gate driver 140 through the data initialization gate line GIL. The first terminal of the fourth transistor TR4 may receive the first initialization voltage VINT. The second terminal of the fourth transistor TR4 may be connected to the gate terminal of the first transistor TR1 (or the first terminal of the third transistor TR3).

The fourth transistor TR4 may supply the first initialization voltage VINT to the gate terminal of the first transistor TR1 during an activation period of the data initialization gate signal GI[n]. The fourth transistor TR4 may operate in a linear region. The fourth transistor TR4 may initialize the gate terminal of the first transistor TR1 to the first initialization voltage VINT during the activation period of the data initialization gate signal GI[n]. The first initialization voltage VINT may have a voltage level that is sufficiently lower than a voltage level of the data voltage VDATA maintained by the storage capacitor CST in a previous frame, and the first initialization voltage VINT may be supplied to the gate terminal of the first transistor TR1. The first initialization voltage VINT may have a voltage level that is sufficiently higher than the voltage level of the data voltage VDATA maintained by the storage capacitor CST in the previous frame, and the first initialization voltage VINT may be supplied to the gate terminal of the first transistor TR1.

The fourth transistor TR4 may include an NMOS transistor, which may not generate too much leakage current. When the leakage current is generated in the fourth transistor TR4, the voltage at the gate terminal of the first transistor TR1 may be increased, and the driving current ID may be decreased, so that the luminance may be decreased. In order to reduce the leakage current of the fourth transistor TR4 in a high gray level, the fourth transistor TR4 may be/include an NMOS transistor.

The gate terminal of the fifth transistor TR5 may receive an emission signal EM[n]. The emission signal EM[n] may be provided from the emission driver 190 through the emission lines EML. The first terminal of the fifth transistor TR5 may receive the first power supply voltage ELVDD. The second terminal of the fifth transistor TR5 may be connected to the first terminal of the first transistor TR1. The fifth transistor TR5 may supply the first power supply voltage ELVDD to the first terminal of the first transistor TR1 during an activation period of the emission signal EM[n]. The fifth transistor TR5 may cut off the supply of the first power supply voltage ELVDD during an inactivation period of the emission signal EM[n]. The fifth transistor TR5 may operate in a linear region. Since the fifth transistor TR5 supplies the first power supply voltage ELVDD to the first terminal of the first transistor TR1 during the activation period of the emission signal EM[n], the first transistor TR1 may generate the driving current ID. Since the fifth transistor TR5 cuts off the supply of the first power supply voltage ELVDD during the inactivation period of the emission signal EM[n], the data voltage VDATA supplied to the first terminal of the first transistor TR1 may be supplied to the gate terminal of the first transistor TR1.

The gate terminal of the sixth transistor TR6 may receive the emission signal EM[n]. The first terminal of the sixth transistor TR6 may be connected to the second terminal of the first transistor TR1. The second terminal of the sixth transistor TR6 may be connected to the first terminal of the organic light emitting diode OLED. The sixth transistor TR6 may supply the driving current ID generated by the first transistor TR1 to the organic light emitting diode OLED during the activation period of the emission signal EM[n]. The sixth transistor TR6 may operate in a linear region. Since the sixth transistor TR6 supplies the driving current ID generated by the first transistor TR1 to the organic light emitting diode OLED during the activation period of the emission signal EM[n], the organic light emitting diode OLED may output the light. Since the sixth transistor TR6 electrically separates the first transistor TR1 and the organic light emitting diode OLED from each other during the inactivation period of the emission signal EM[n], the compensated data voltage VDATA' supplied to the second terminal of the first transistor TR1 may be supplied to the gate terminal of the first transistor TR1.

The gate terminal of the seventh transistor TR7 (e.g., a first switching transistor) may receive a data write gate signal GW[n+1]. The first terminal of the seventh transistor TR7 may receive the second initialization voltage VAINT. The second terminal of the seventh transistor TR7 may be connected to the first terminal of the organic light emitting diode OLED. The seventh transistor TR7 may supply the second initialization voltage VAINT to the first terminal of the organic light emitting diode OLED during an activation period of the data write gate signal GW[n+1]. The seventh transistor TR7 may operate in a linear region. The seventh transistor TR7 may initialize the first terminal of the organic light emitting diode OLED to the second initialization voltage VAINT during the activation period of the data write gate signal GW[n+1]. The data write gate signal GW[n+1] may be substantially the same as the data write gate signal GW[n] of one horizontal time before.

The storage capacitor CST may be connected between the first power supply voltage line ELVDDL and the gate terminal of the first transistor TR1. The storage capacitor CST may include a first terminal and a second terminal. The first terminal of the storage capacitor CST may receive the first power supply voltage ELVDD, and the second terminal of the storage capacitor CST may be connected to the gate terminal of the first transistor TR1. The storage capacitor CST may maintain a voltage level of the gate terminal of the first transistor TR1 during an inactivation period of the data write gate signal GW[n]. The inactivation period of the data write gate signal GW[n] may include the activation period of the emission signal EM[n], and the driving current ID generated by the first transistor TR1 may be supplied to the organic light emitting diode OLED during the activation period of the emission signal EM[n]. Therefore, the driving current ID generated by the first transistor TR1 may be supplied to the organic light emitting diode OLED based on the voltage level maintained by the storage capacitor CST.

The pixel circuit PC may include at least one driving transistor, at least one switching transistor, and at least one storage capacitor. The numbers of the components of the pixel circuit PC may be determined according to particular embodiments.

The light emitting element included in the pixel PX may be/include the organic light emitting diode OLED, a quantum dot (QD) light emitting element, an inorganic light emitting diode, and/or the like.

Figure 7:
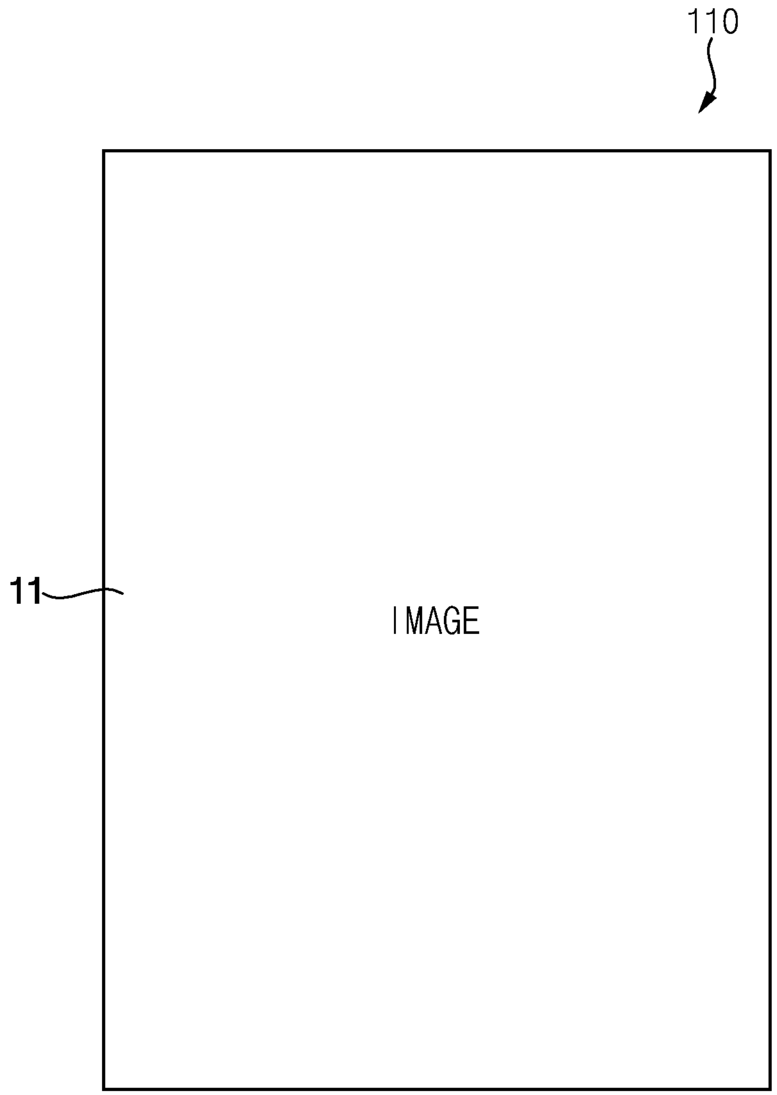
FIG. 7 is a block diagram showing a method of driving the display panel of FIG. 4 according to embodiments.
Figure 8:
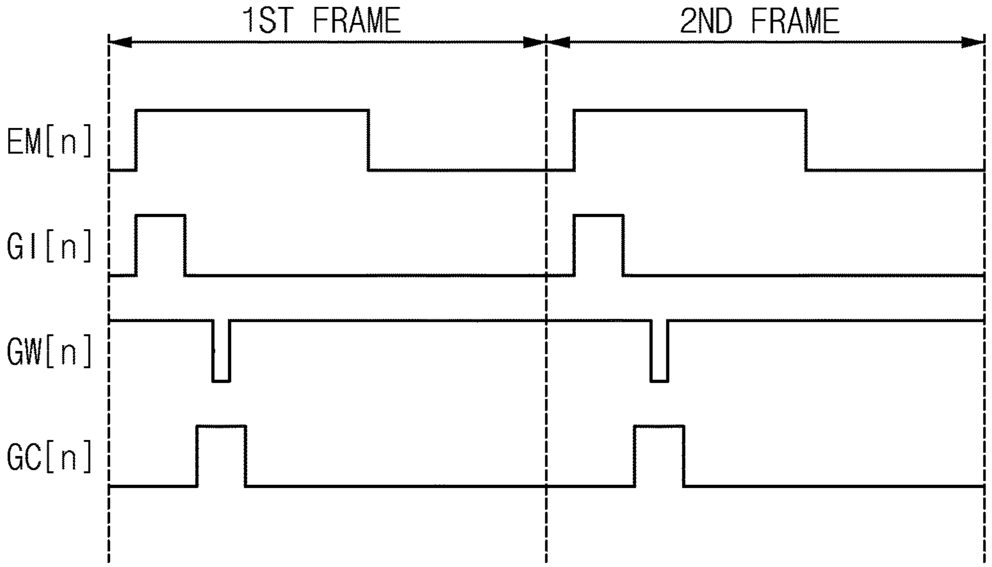
FIG. 8 and FIG. 9 are timing diagrams for describing high-frequency driving and low-frequency driving of the display panel of FIG. 7 according to embodiments.
Figure 9:
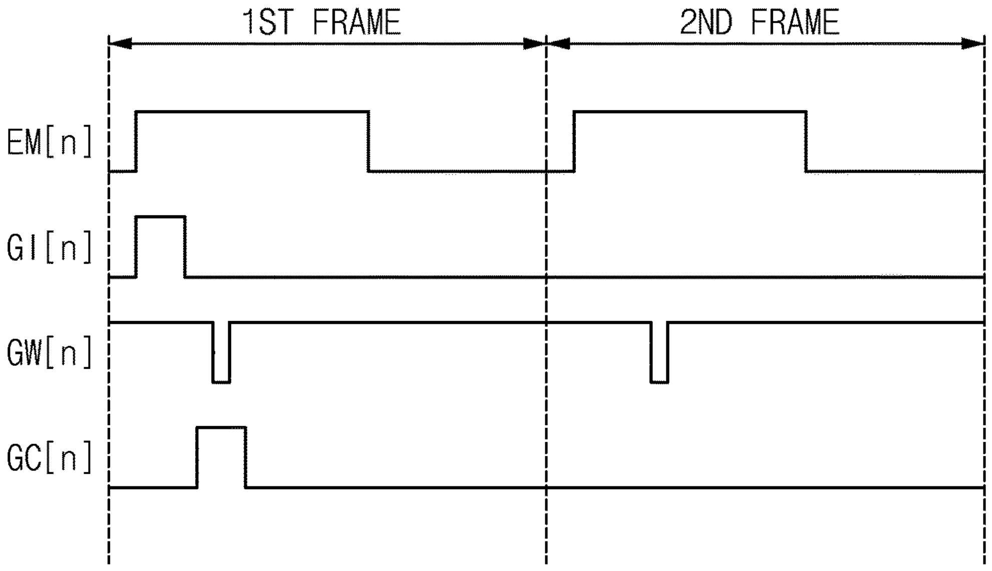
Figure 10:
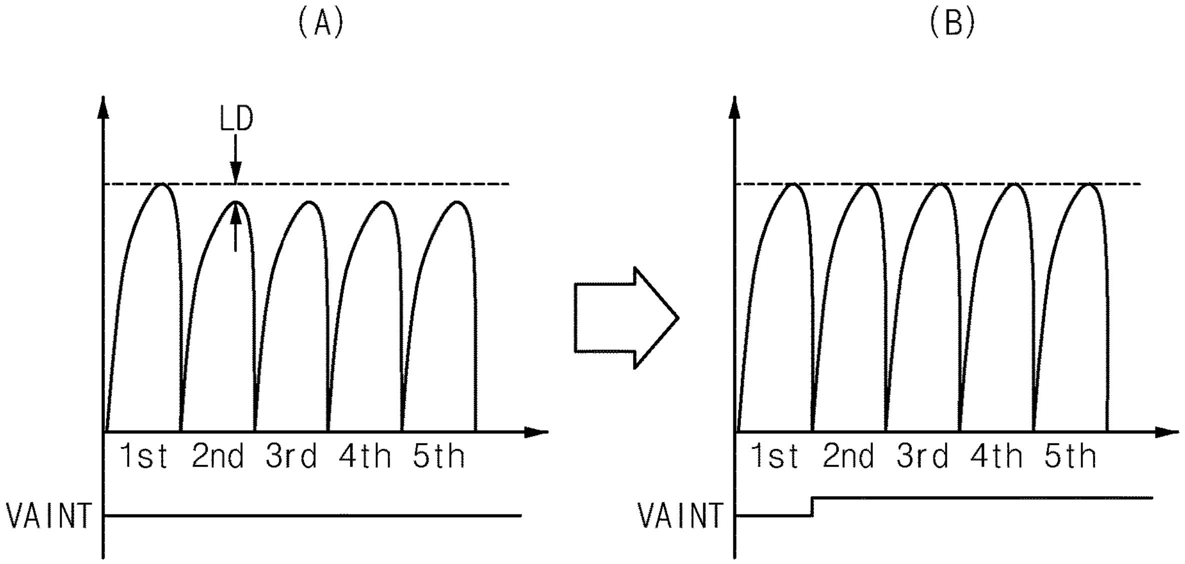
FIG. 10 is a view for describing offset compensation of a second initialization voltage when the display panel of FIG. 7 is driven at a low frequency according to embodiments.

FIG. 7 is a block diagram showing one example of a method of driving the display panel of FIG. 4 according to embodiments. FIGS. 8 and 9 are timing diagrams for describing high-frequency driving and low-frequency driving of the display panel of FIG. 7 according to embodiments. FIG. 10 is a view for describing offset compensation of a second initialization voltage when the display panel of FIG. 7 is driven at a low frequency according to embodiments. FIG. 8 is a timing diagram showing signals applied to a pixel PX when the display panel 110 is driven at a high frequency, and FIG. 9 is a timing diagram showing signals applied to the pixel PX when the display panel 110 is driven at a low frequency.

Referring to FIG. 7, the display panel 110 may include a display area 11, and an image IMAGE may be displayed in the display area 11. The display area 11 of the display panel 110 may be driven at a high frequency, or may be driven at a low frequency. The display panel 110 may perform the MFD as shown in FIG. 4, or may be driven at a low frequency or a high frequency as shown in FIG. 7.

Referring to FIG. 8, in first and second frames, the inactivation period (e.g., a logic high level period) of the emission signal EM[n] may overlap the activation period of each of the data initialization gate signal GI[n], the data write gate signal GW[n], and the compensation gate signal GC [n].

When the inactivation period of the emission signal EM[n] starts after the activation period (e.g., a logic low level period) of the emission signal EM[n] ends, the activation period (e.g., a logic high level period) of the data initialization gate signal GI[n] may start. Referring to FIG. 5, the fourth transistor TR4 may be turned on during the logic high level period of the data initialization gate signal GI[n], and a current may flow out from the gate terminal of the first transistor TR1 to the first initialization voltage line VINTL. During the activation period of the data initialization gate signal GI[n], the gate terminal of the first transistor TR1 may be initialized to the first initialization voltage VINT.

After the activation period of the data initialization gate signal GI[n] ends, the activation period of the data write gate signal GW[n] and the activation period of the compensation gate signal GC[n] may proceed. After the activation period of the data initialization gate signal GI[n] ends, the activation period (e.g., a logic high level period) of the compensation gate signal GC[n] may start, and the activation period of the data write gate signal GW[n] may be within the activation period of the compensation gate signal GC[n].

During the activation period (e.g., a logic low level period) of the data write gate signal GW[n], the second transistor TR2 may be turned on, and may provide the data voltage VDATA to the second terminal of the first transistor TR1 in the first frame. During the activation period of the data write gate signal GW[n], the second transistor TR2 may provide the bias power supply voltage VBIAS to the first terminal of the first transistor TR1 in the second frame. The first transistor TR1 may be in an on-bias state.

During the activation period (e.g., the logic high level period) of the compensation gate signal GC[n], the third transistor TR3 may be turned on, and may provide the data voltage VDATA, which is provided to the second terminal of the first transistor TR1, to the gate terminal of the first transistor TR1 in the first frame.

When the display panel 110 is driven at a high frequency, during the activation period of the data initialization gate signal GI[n], due to a capacitor formed by the data initialization gate line GIL and the first terminal (i.e., the anode terminal) of the organic light emitting diode OLED, the organic light emitting diode OLED may emit a substantially maintained light (e.g., ripple light emission). No significant luminance decrease or luminance increase (i.e., luminance deviation) of the organic light emitting diode OLED may occur in the display panel 110, and it may be unnecessary to apply the offset to the second initialization voltage VAINT for initializing the first terminal of the organic light emitting diode OLED.

Referring to FIGS. 9 and 10, the inactivation period of the emission signal EM[n] in the first frame may overlap the activation period of each of the data initialization gate signal GI[n], the data write gate signal GW[n], and the compensation gate signal GC[n]; the inactivation period of the emission signal EM[n] in the second frame may overlap the activation period of the data write gate signal GW[n]. When the display panel 110 is driven at a low frequency, the data initialization gate signal GI[n] and the compensation gate signal GC[n] may not be activated in the second frame. Since no capacitor is formed by the data initialization gate line GIL and the first terminal of the organic light emitting diode OLED, the organic light emitting diode OLED may not sufficiently maintain the light, and the luminance of the organic light emitting diode OLED may decrease from and/or after the second frame, as shown in part (A) of FIG. 10. A luminance deviation LD may occur in the pixels PX included in the display panel 110 from and/or after the second frame. The offset may be applied to the second initialization voltage VAINT to compensate for the reduced luminance of the organic light emitting diode OLED from and/or after the second frame. Accordingly, a voltage level of the second initialization voltage VAINT may be increased from and/or after the second frame, so that the luminance deviation LD of the organic light emitting diode OLED may be prevented, as shown in part (B) of FIG. 10. The luminance of the organic light emitting diode OLED may be increased from and/or after the second frame depending on the type of the display panel 110. The luminance deviation LD may occur in the pixels PX included in the display panel 110 from and/or after the second frame. The offset may be applied to the second initialization voltage VAINT to compensate for the increased luminance of the organic light emitting diode OLED from and/or after the second frame. Accordingly, the voltage level of the second initialization voltage VAINT may be decreased after the second frame, so that the luminance deviation LD of the organic light emitting diode OLED may be prevented.

Figure 11:
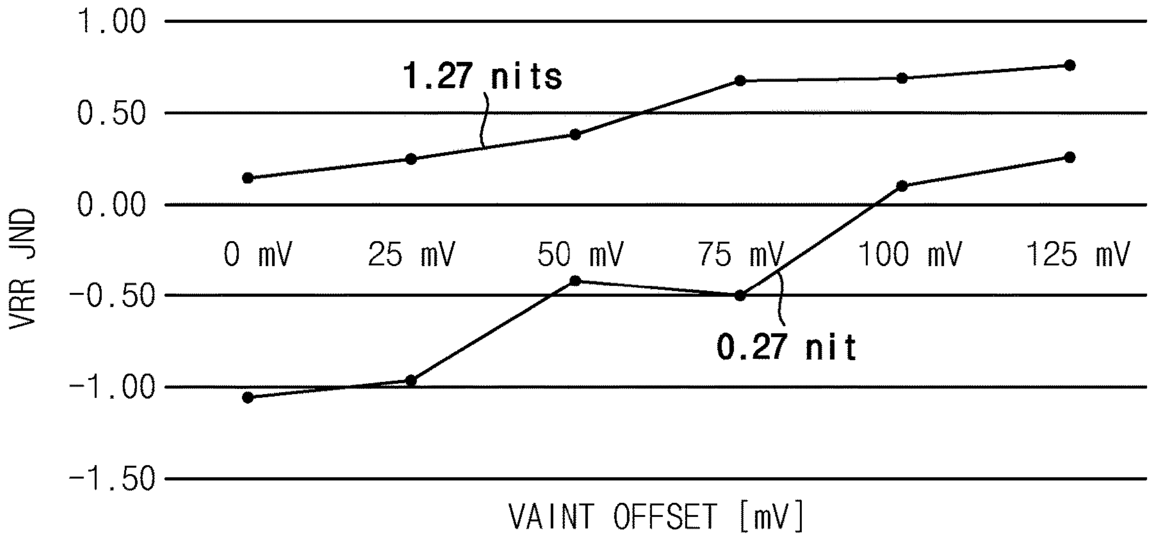
FIG. 11 is a view for describing a luminance deviation occurring at a specific luminance after offset compensation is performed on the second initialization voltage when the display panel of FIG. 10 is driven at a low frequency according to embodiments.

FIG. 11 is a view for describing a luminance deviation occurring at a specific luminance after offset compensation is performed on the second initialization voltage when the display panel of FIG. 10 is driven at a low frequency according to embodiments. In FIG. 11, the horizontal axis may represent a voltage magnitude of the offset (or adjustment voltage) applied to the second initialization voltage VAINT, and the vertical axis may represent the luminance deviation. A value of 0 mV on the horizontal axis may represent that no offset voltage is applied to the second initialization voltage VAINT. A value of about 125 mV on the horizontal axis may represent that an offset voltage of about 125 mV is applied to the second initialization voltage VAINT.

Referring to FIG. 11, the graph associated with 1.27 nits and located on an upper side may represent the brightness of a pixel of the display panel 110 being about 1.27 nits when the display panel 110 is driven at a low frequency. The graph associated with 0.27 nit and located on a lower side may represent the brightness of a pixel of the display panel 110 being about 0.27 nits when the display panel 110 is driven at the low frequency.

When the brightness is about 1.27 nits, the luminance deviation is not significant when no offset of the second initialization voltage VAINT is applied (e.g., the offset being about 0 mV), and the luminance deviation may increase as the offset voltage of the second initialization voltage VAINT increases.

When the brightness is about 0.27 nit, the luminance deviation is sufficiently low when the offset voltage of the second initialization voltage VAINT is about 100 mV.

When the display panel 110 is driven at the low frequency, and the brightness of the display panel 110 is about 1.27 nits, no offset voltage has to be applied to the second initialization voltage VAINT. When the display panel 110 is driven at the low frequency, and the brightness of the display panel 110 is about 0.27 nits, an offset voltage has to be applied to the second initialization voltage VAINT.

Accordingly, the low gray level range may be defined as being from the lowest gray level value when the brightness of the display panel 110 is about 0.2 nits to the highest gray level value when the brightness of the display panel 110 is about 1 nit. The pixel data value exceeding about 1 nit may be excluded from the application of the offset to the second initialization voltage VAINT.

Figure 12A:
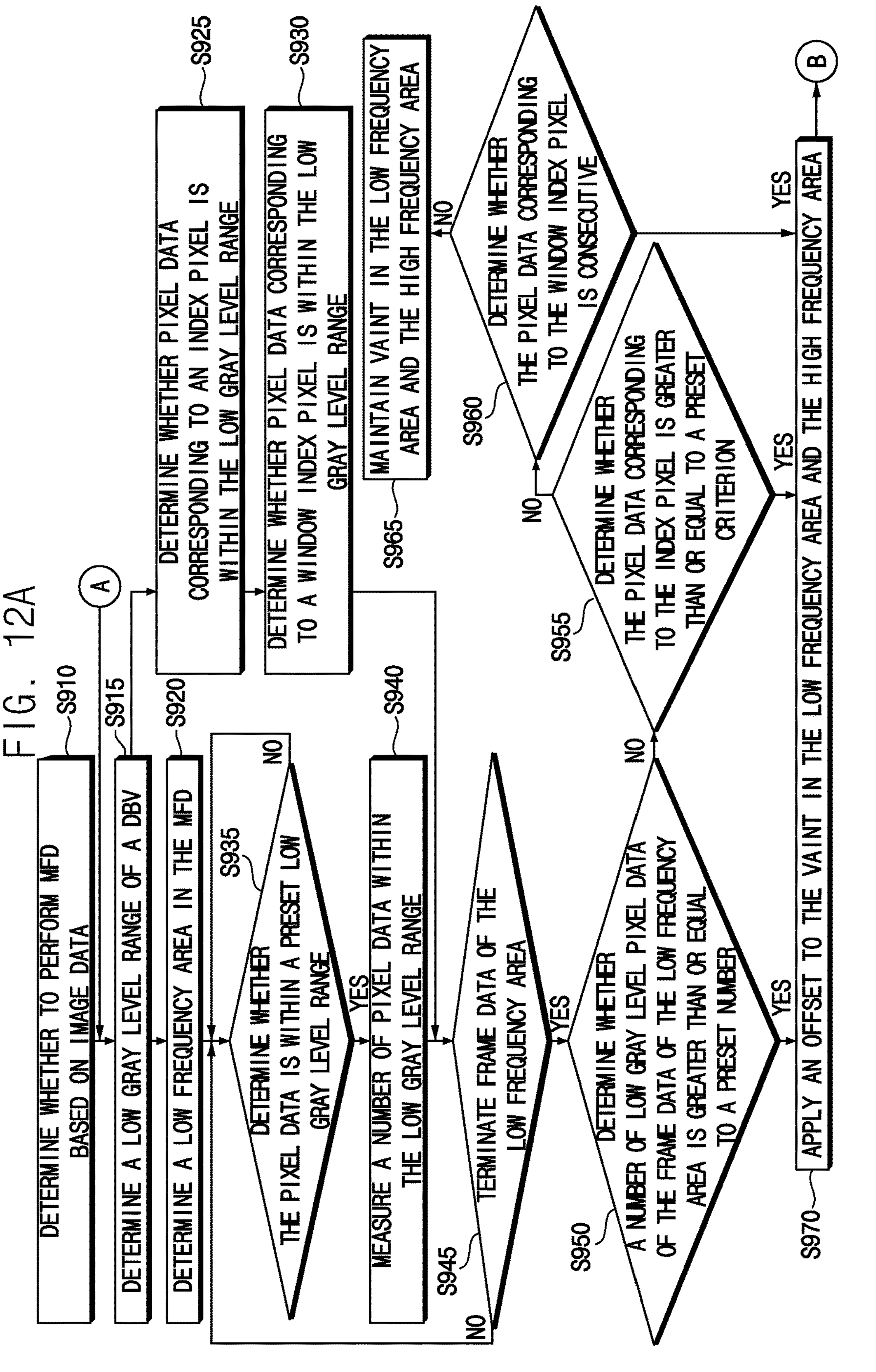
FIG. 12*a* and FIG. 12*b* are flowcharts showing a method of driving a display device according to embodiments.
Figure 12B:
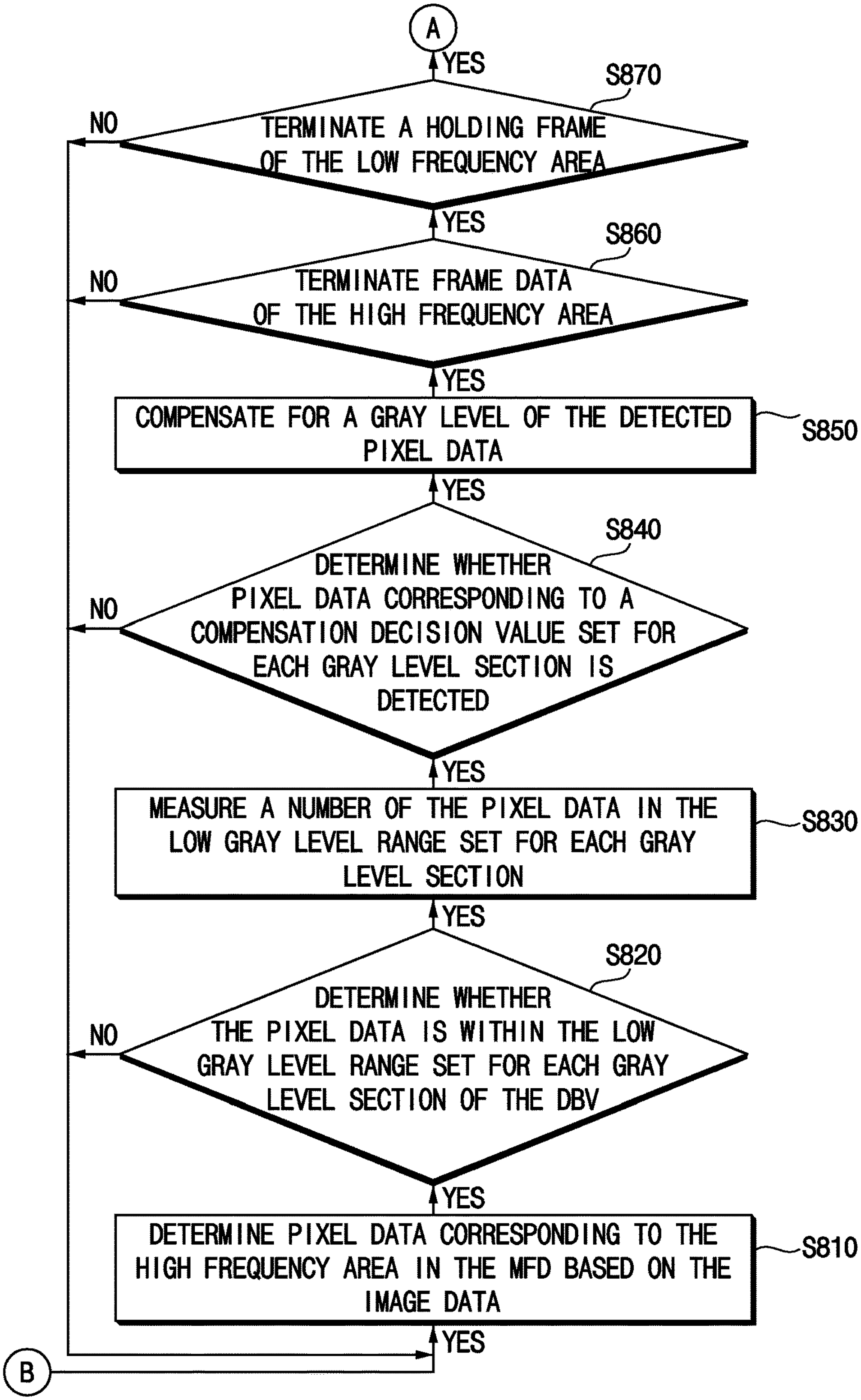

FIGS. 12*a* and 12*b* are flowcharts showing a method of driving a display device according to embodiments. FIGS. 13, 14, 15, 16, 17, 18, 19, and 20 are views for describing the method of driving the display device of FIGS. 12*a* and 12*b* according to embodiments. FIG. 21 is a timing diagram for describing the method of driving the display device of FIGS. 12*a* and 12*b* according to embodiments.

Referring to FIGS. 12*a* and 12*b*, a method of driving a display device may include: determining whether to perform MFD based on image data (S910); determining a low gray level range of a DBV (S915); determining a low frequency area in the MFD (S920); determining whether pixel data corresponding to an index pixel is within the low gray level range (S925); determining whether pixel data corresponding to a window index pixel is within the low gray level range (S930); determining whether the pixel data is within a preset low gray level range (S935); measuring/determining a number of pixel data within the low gray level range (S940); terminating/stopping frame data of the low frequency area (S945); determining whether a number of low gray level pixel data of the frame data of the low frequency area is greater than or equal to a preset number (S950); determining whether the pixel data corresponding to the index pixel is greater than or equal to a preset criterion (S955); determining whether the pixel data corresponding to the window index pixel is consecutive (S960); maintaining a second initialization voltage in the low frequency area and the high frequency area (S965); applying an offset to the second initialization voltage in the low frequency area and the high frequency area (S970); determining pixel data corresponding to the high frequency area in the MFD based on the image data (S810); determining whether the pixel data is within the low gray level range set for each gray level section of the DBV (S820); measuring/determining a number of the pixel data in the low gray level range set for each gray level section (S830); determining whether pixel data corresponding to a compensation decision value set for each gray level section is detected (S840); compensating for a gray level of the detected pixel data (S850); terminating/stopping frame data of the high frequency area (S860); and terminating/stopping a holding frame of the low frequency area (S870).

Referring to FIGS. 1, 4, and 21, in a first frame, the first display area 21 of the display panel 110 may be driven at 120 Hz (e.g., a high frequency), the first frame may correspond to a data write period (e.g., a write frame), the data voltage VDATA may be provided to the pixel PX, and the offset may not be applied to the second initialization voltage VAINT.

Referring to FIGS. 1, 2, 4, and 12, the low frequency offset compensator 130 may receive the image data IMG, and may receive driving frequency information and image data information (or pixel data information) from the image data IMG. The first calculator 131 may determine whether the second display area 22 of the display panel 110 is driven at a low frequency based on the image data IMG.

Referring to FIGS. 2, 12, and 21, when the second display area 22 of the display panel 110 is driven at the low frequency, the first calculator 131 may select DBV data corresponding to a current brightness of the display panel among DBV data stored in the first memory 132, and may determine a low gray level range of the selected DBV data. Referring to FIG. 13, the low gray level range may be from a lowest gray level value when a brightness of the display panel 110 is about 0.2 nits to a highest gray level value when the brightness of the display panel 110 is about 1 nit.

The DBV data may be a luminance value of a light (e.g., a white light) emitted from the pixels PX that corresponds to a maximum gray level by the display panel 110, in which a unit of a luminance is nit. An overall brightness of the display panel 110 may vary according to a setting of a user of the display device 100. The DBV data may include first to $n^{th}$ DBV data. When the display panel 110 is implemented with 0 to 255 gray levels, the first DBV data may signify that the display panel 110 emits a light with 255 gray levels and a brightness of about 2 nits (e.g., a lowest luminance DBV), and the low gray level range is from 90 (i.e., a lowest gray level) to 187 (i.e., a highest gray level). When the display panel 110 is implemented with 0 to 255 gray levels, the $n^{th}$ DBV data may signify that the display panel 110 emits a light with 255 gray levels and a brightness of about 1000 nits (e.g., a highest luminance DBV), and the low gray level range is from 6 (i.e., the lowest gray level) to 11 (i.e., the highest gray level). The low gray level range may be a criterion for applying the offset to the second initialization voltage VAINT when the display panel 110 is driven at the low frequency. Since it has been experimentally found that a luminance deviation occurs in the pixel PX when the offset of the second initialization voltage VAINT is applied to pixel data exceeding about 1 nit, the offset of the second initialization voltage VAINT may be applied to pixel data between about 0.2 nits and about 1 nit.

Referring to FIG. 21, in a second frame, the first display area 21 of the display panel 110 may be driven at 120 Hz, and the second display area 22 of the display panel 110 may be driven at 10 Hz (e.g., a low frequency). The second frame may correspond to the data write period. In the second frame, a first data voltage VDATA1 may be provided to a pixel PX disposed in the first display area 21, and a second data voltage VDATA2 may be provided to a pixel PX disposed in the second display area 22. The offset may not be applied to the second initialization voltage VAINT in the second frame. The first calculator 131 may determine whether the second display area 22 of the display panel 110 is driven at a low frequency based on the image data IMG before the second data voltage VDATA2 is provided to the pixel PX in the second frame. When the second display area 22 of the display panel 110 is driven at the low frequency, the first calculator 131 may recognize the low-frequency driving of the second display area 22 of the display panel 110. The first calculator 131 may identify the second display area 22 as a low frequency area in the MFD.

Referring to FIGS. 2, 12, 13, and 14, after the low gray level range of the selected DBV data is determined, the first calculator 131 may determine whether the pixel data is within the preset low gray level range based on gray level information included in each of the pixel data values corresponding to the second display area 22. The pixel data values may correspond to pixels arranged in one pixel row in the second display area 22, respectively. For example, when the display panel 110 includes first to $m^{th}$ pixel rows, and 1440 pixels are arranged in each of the pixel rows, pixel data corresponding to the first pixel row may include first to $1440^{th}$ pixel data values, and pixel data corresponding to the $m^{th}$ pixel row may also include first to $1440^{th}$ pixel data values. Pixel data values corresponding to the first to $m^{th}$ pixel rows will be defined as all frame data. First to $(i-1)^{th}$ pixel rows among the first to $m^{th}$ pixel rows may correspond to the first display area 21, and frame data corresponding to the first display area 21 among the all frame data may be defined as frame data corresponding to the high frequency area. In addition, $i^{th}$ to $m^{th}$ pixel rows among the first to $m^{th}$ pixel rows may correspond to the second display area 22, and frame data corresponding to the second display area 22 among the all frame data may be defined as frame data corresponding to the low frequency area. The frame data shown in FIG. 14 may be the frame data corresponding to the low frequency area, in which a first line may correspond to a first line in the second display area 22, and a last line may correspond to a last line in the second display area 22. The first line may be the $i^{th}$ pixel row, and the last line may be the $m^{th}$ pixel row.

After the first calculator 131 determines whether each of the pixel data values is within the preset low gray level range, the first calculator 131 may measure/determine a number of pixel data within the low gray level range with respect to the pixel data corresponding to pixel rows (e.g., the $i^{th}$ to $m^{th}$ pixel rows) located in the second display area 22 among the first to $m^{th}$ pixel rows.

Figure 14:
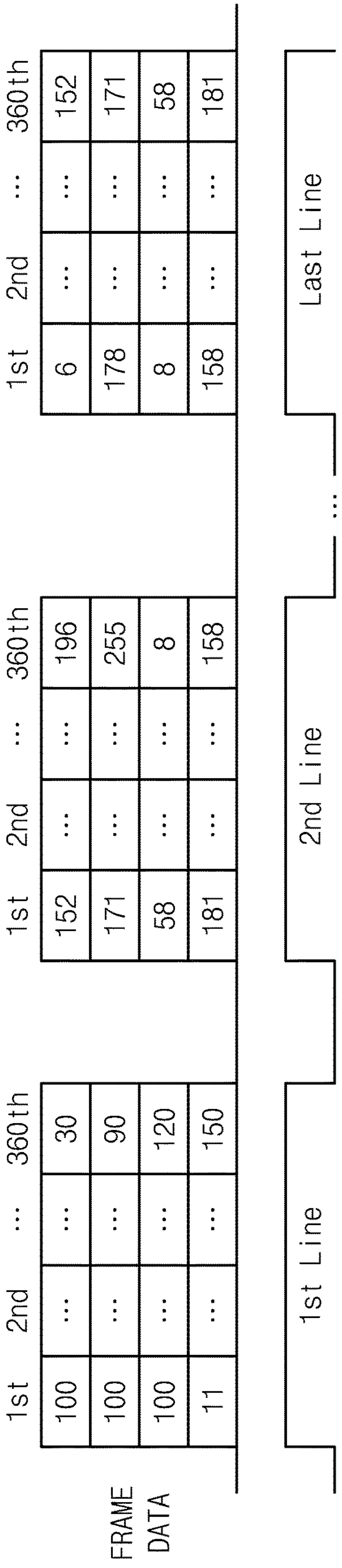
Figure 15:
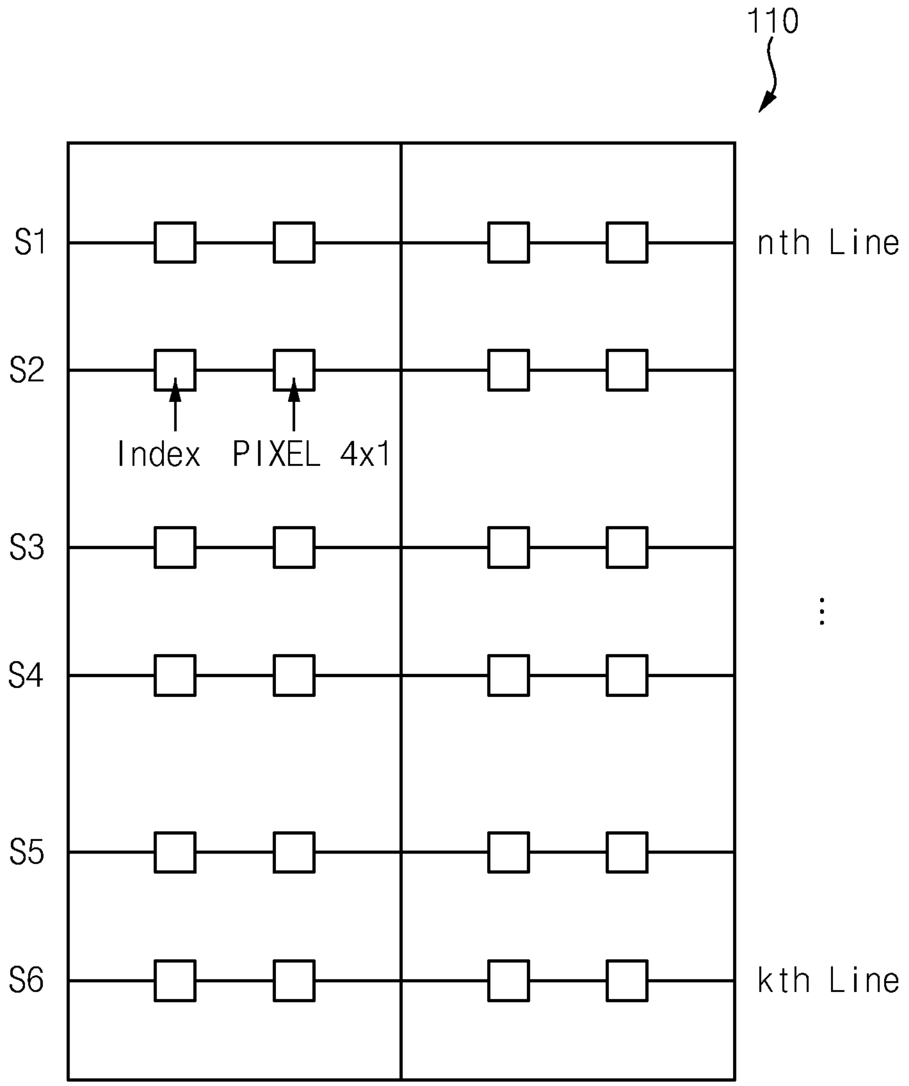
Figure 16:
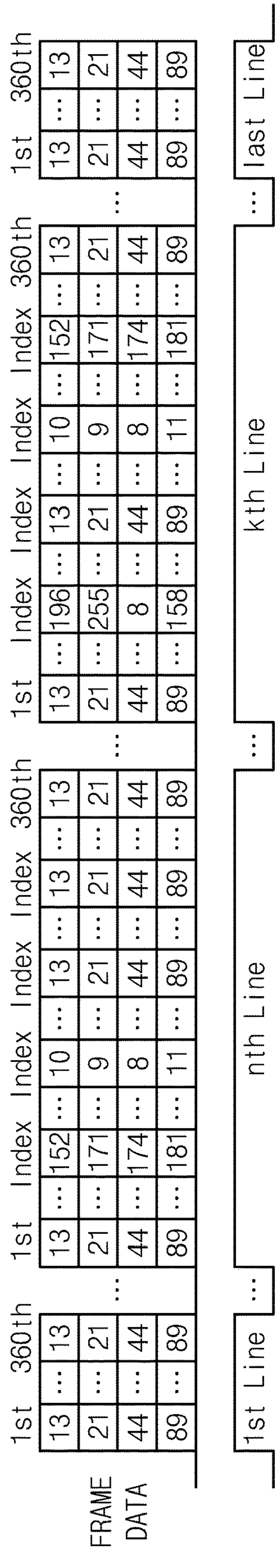
Figure 17:
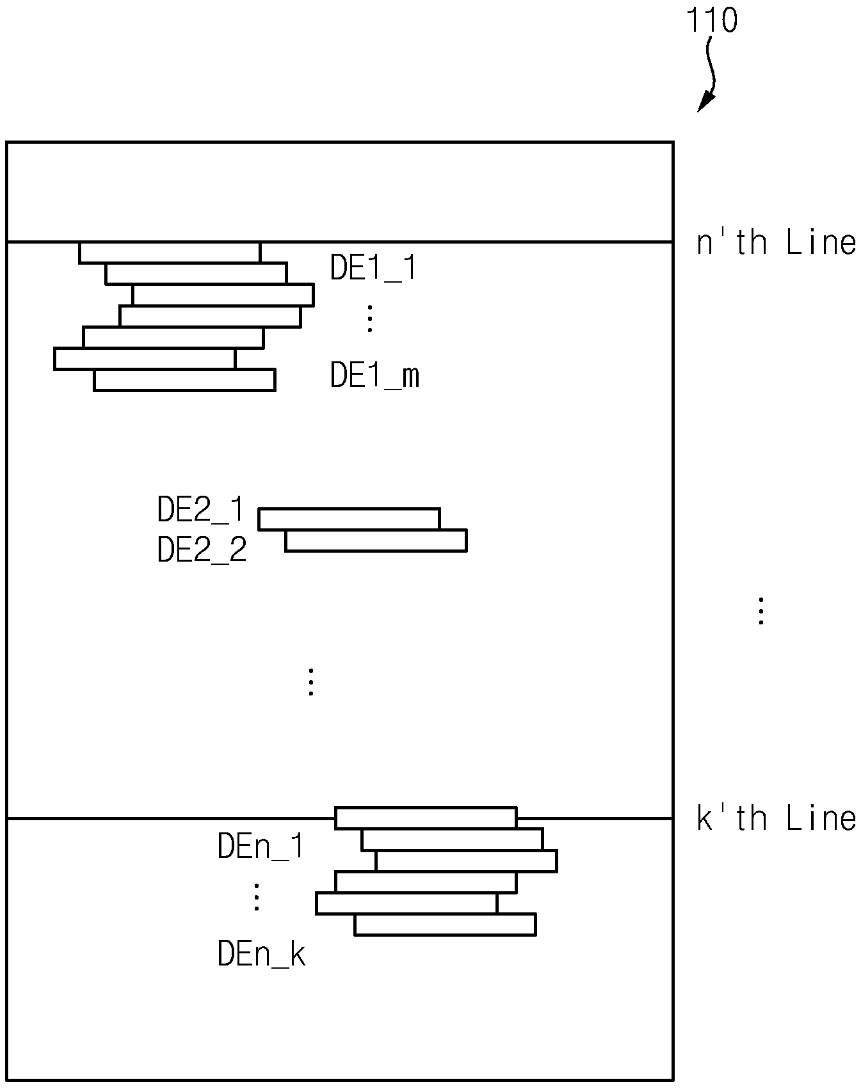
Figure 18:
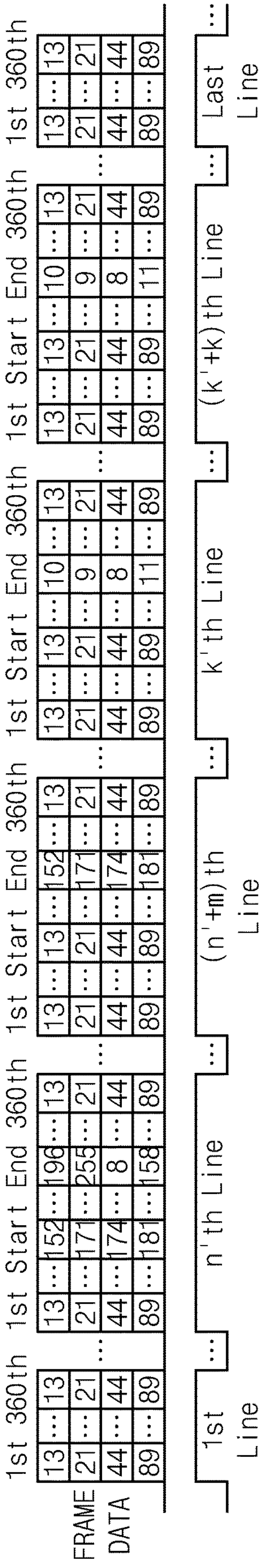

Referring to FIG. 14, frame data (e.g., the frame data corresponding to the low frequency area) including pixel data corresponding to the $i^{th}$ to $m^{th}$ pixel rows may be provided to the first calculator 131 based on a clock signal, and the first calculator 131 may determine whether each of the pixel data values is within the preset low gray level range. The first calculator 131 may measure/determine the number of the pixel data corresponding to the $i^{th}$ to $m^{th}$ pixel rows within the low gray level range, and the first calculator 131 may store the measured/determined number in the first memory 132. The number of the pixel data within the low gray level range may be measured/determined for each pixel row, and when the number of the pixel data within the low gray level range is measured in the $m^{th}$ pixel row, a total number of the pixel data within the low gray level range with respect to the frame data corresponding to the low frequency area may be stored in the first memory 132. There may be a delay by one clock signal in a process of storing the number of the pixel data within the low gray level range in the first memory 132.

The pixel data of FIG. 14 may correspond to red pixel data, and the same process may be performed for green pixel data and blue pixel data.

After the above process steps are completely performed, the frame data corresponding to the low frequency area may be terminated/stopped (i.e., the measurement/determination process of the total number of the pixel data within the low gray level range with respect to the frame data corresponding to the low frequency area may be terminated/stopped).

Referring to FIGS. 1, 2, 12, and 21, after the measurement of the number of the pixel data within the low gray level range with respect to the frame data corresponding to the low frequency area is terminated, the first calculator 131 may determine whether a total number of the pixel data values within the low gray level range with respect to the frame data corresponding to the low frequency area is greater than or equal to a preset number.

When the total number of the pixel data within the low gray level range with respect to the frame data corresponding to the low frequency area is greater than or equal to the preset number, the first calculator 131 may determine that the offset has to be applied to the second initialization voltage VAINT, and the first compensation signal generator 133 may generate the compensation signal CS to provide the generated compensation signal CS to the power supply unit 160. The power supply unit 160 may receive the compensation signal CS from the low frequency offset compensator 130 to provide the second initialization voltage VAINT (to which the offset is applied) to the pixels PX disposed in the first display area 21 and the second display area 22. Only when the second display area 22 of the display panel 110 is driven at the low frequency, and the image displayed in the second display area 22 has a low luminance, the display device 100 may apply the offset to the second initialization voltage VAINT.

Referring to FIGS. 2, 12, 15, and 16, after the low gray level range of the selected DBV data is determined, the first calculator 131 may determine whether pixel data corresponding to an index pixel (or an index pixel group) in the second display area 22 is within the low gray level range. The index pixel may be/include four pixels selected among pixels overlapping at least four regions selected from each preset pixel row among the pixel rows located in the second display area 22. The four pixels selected from each region may be inconsecutive, and 16 pixels may be selected from each pixel row.

When the number of the pixel data values within the low gray level range with respect to the frame data corresponding to the second display area 22 is less than or equal to the preset number, the first calculator 131 may determine that it is unnecessary to apply the offset to the second initialization voltage VAINT with respect to the frame data corresponding to the second display area 22. However, even when the number of the pixel data within the low gray level range with respect to the frame data corresponding to the second display area 22 is less than or equal to the preset number, when pixels corresponding to the pixel data within the low gray level range are clustered in a preset region, a luminance decrease or a luminance increase (i.e., the luminance deviation) may be undesirably conspicuous in the clustered pixels (e.g., a low-luminance pattern). Therefore, the first calculator 131 may determine whether the pixel data corresponding to the index pixel is within the low gray level range. When the pixel data corresponding to the index pixel within the low gray level range is greater than or equal to a preset criterion, the first calculator 131 may determine that the offset has to be applied to the second initialization voltage VAINT, and the first compensation signal generator 133 may generate the compensation signal CS to provide the generated compensation signal CS to the power supply unit 160.

Referring to FIGS. 2, 12, 17, and 18, after determining whether the pixel data corresponding to the index pixel is within the low gray level range, the first calculator 131 may determine whether pixel data corresponding to a window index pixel is within the low gray level range. The window index pixel may be/include pixels located in a preset region set in each of the pixel rows located in the second display area 22. The window index pixel may include at least four consecutive pixels in each of the pixel rows located in the second display area 22, and the window index pixel may be located in a preset region having a rectangular shape.

When the number of the pixel data within the low gray level range with respect to the frame data corresponding to the second display area 22 is less than or equal to the preset number, the first calculator 131 may determine that it is unnecessary to apply the offset to the second initialization voltage VAINT with respect to the frame data corresponding to the second display area 22. However, even when the number of the pixel data within the low gray level range with respect to the frame data corresponding to the second display area 22 is less than or equal to the preset number, when pixels corresponding to the pixel data within the low gray level range are consecutively located (e.g., in the low-luminance pattern) in a preset region of adjacent pixel rows among the pixel rows located in the second display area 22, the luminance deviation may be undesirably conspicuous in the pixels located in the preset region of the adjacent pixel rows. Therefore, the first calculator 131 may determine whether the pixel data corresponding to the window index pixel is within the low gray level range, and when the pixel data corresponding to the window index pixel within the low gray level range is greater than or equal to a preset criterion, the first calculator 131 may determine that the offset has to be applied to the second initialization voltage VAINT, and the first compensation signal generator 133 may generate the compensation signal CS to provide the generated compensation signal CS to the power supply unit 160.

Referring to FIGS. 1, 3, 12, 19, and 21, when the low frequency offset compensator 130 provides the compensation signal CS to the power supply unit 160, the high frequency data compensator 170 may receive the compensation signal CS from the low frequency offset compensator 130, and may receive information on the selected DBV data from the compensation signal CS. The high frequency data compensator 170 may receive the image data IMG, and may receive the pixel data information from the image data IMG.

The second calculator 171 may determine pixel data corresponding to the first display area 21 of the display panel 110 based on the image data IMG. The second calculator 171 may select one section group among section groups including gray level sections stored in the second memory 172 based on the information on the selected DBV data. A low gray level range, a compensation decision value, and a gray level compensation value may be set in each of the gray level sections included in the selected section group.

The section groups may include first to $n^{th}$ section groups. The low gray level range of the first DBV data may be 90 to 187. The first section group may correspond to the first DBV data, and the first section group may include a first gray level section R1 to an $m^{th}$ gray level section Rm. In the first section group, a low gray level range of the first gray level section R1 may be 90 to 99, a compensation decision value of the first gray level section R1 may be 8, and a gray level compensation value of the first gray level section R1 may be −2. In the first section group, a low gray level range of the second gray level section R2 may be 100 to 109, a compensation decision value of the second gray level section R2 may be 7, and a gray level compensation value of the second gray level section R2 may be −2. In the first section group, a low gray level range of the $m^{th}$ gray level section Rm may be 180 to 187, a compensation decision value of the $m^{th}$ gray level section Rm may be 3, and a gray level compensation value of the $m^{th}$ gray level section Rm may be −1. The first to $m^{th}$ gray level sections R1 to Rm in which the low gray level range of the first DBV data is divided by a preset interval may be defined. The low gray level range of the $n^{th}$ DBV data may be 6 to 11. The $n^{th}$ section group may correspond to the $n^{th}$ DBV data, and the $n^{th}$ section group may include a first gray level section R1 and a second gray level section R2. In the $n^{th}$ section group, a low gray level range of the first gray level section R1 may be 6 to 8, a compensation decision value of the first gray level section R1 may be 2, and a gray level compensation value of the first gray level section R1 may be −1. In the $n^{th}$ section group, a low gray level range of the second gray level section R2 may be 9 to 11, a compensation decision value of the second gray level section R2 may be 3, and a gray level compensation value of the second gray level section R2 may be −1. The first and second gray level sections R1 and R2 in which the low gray level range of the $n^{th}$ DBV data is divided by a preset interval may be defined.

After the gray level sections of the selected section group are determined, the second calculator 171 may determine whether the pixel data is within a low gray level range set for each of the gray level sections based on gray level information included in each of the pixel data values corresponding to the first display area 21. The pixel data values may correspond to pixels disposed in one pixel row in the first display area 21, respectively.

After the second calculator 171 determines whether the pixel data is within the set low gray level range, the second calculator 171 may measure a number of pixel data within the low gray level range with respect to the pixel data corresponding to pixel rows located in the first display area 21 among the first to $m^{th}$ pixel rows.

The second calculator 171 may detect pixel data values corresponding to a compensation setting value set for each of the gray level sections in a process of measuring the number of the pixel data within the low gray level range. For example, when the compensation setting value is 8, the second calculator 171 may detect (multiples of $8)^{th}$ (e.g., eighth, $16^{th}$, $24^{th}$, etc.) pixel data values among the measured pixel data values in the process of measuring the number of the pixel data values within the low gray level range.

After the second calculator 171 detects the pixel data values corresponding to the compensation setting value set for each of the gray level sections, the second calculator 171 may determine that a gray level of the pixel data has to be compensated for. The second compensation signal generator 173 may generate the data compensation signal DCS including information (in which the gray level of the detected pixel data is compensated for) to provide the data compensation signal DCS to the data driver 120. The second calculator 171 may generate pixel data (for which the gray level of the detected pixel data is compensated) according to a gray level compensation value set for each of the gray level sections, and may provide the pixel data (compensated for according to the gray level compensation value) to the data driver 120 through the data compensation signal DCS. The data driver 120 may generate the compensated data voltage VDATA' including the pixel data compensated for according to the gray level compensation value. For example, a gray level of the detected pixel data corresponding to the first gray level section R1 of the first section group may be decreased by 2, a gray level of the detected pixel data corresponding to the second gray level section R2 of the first section group may be decreased by 2, and a gray level of the detected pixel data corresponding to the $m^{th}$ gray level section Rm of the first section group may decrease by 1. A gray level of the detected pixel data corresponding to the first gray level section R1 of the $m^{th}$ section group may be decreased by 1, and a gray level of the detected pixel data corresponding to the second gray level section R2 of the $m^{th}$ section group may decrease by 1. The high frequency data compensator 170 and the data driver 120 may be implemented as a single integrated circuit.

Figure 20:
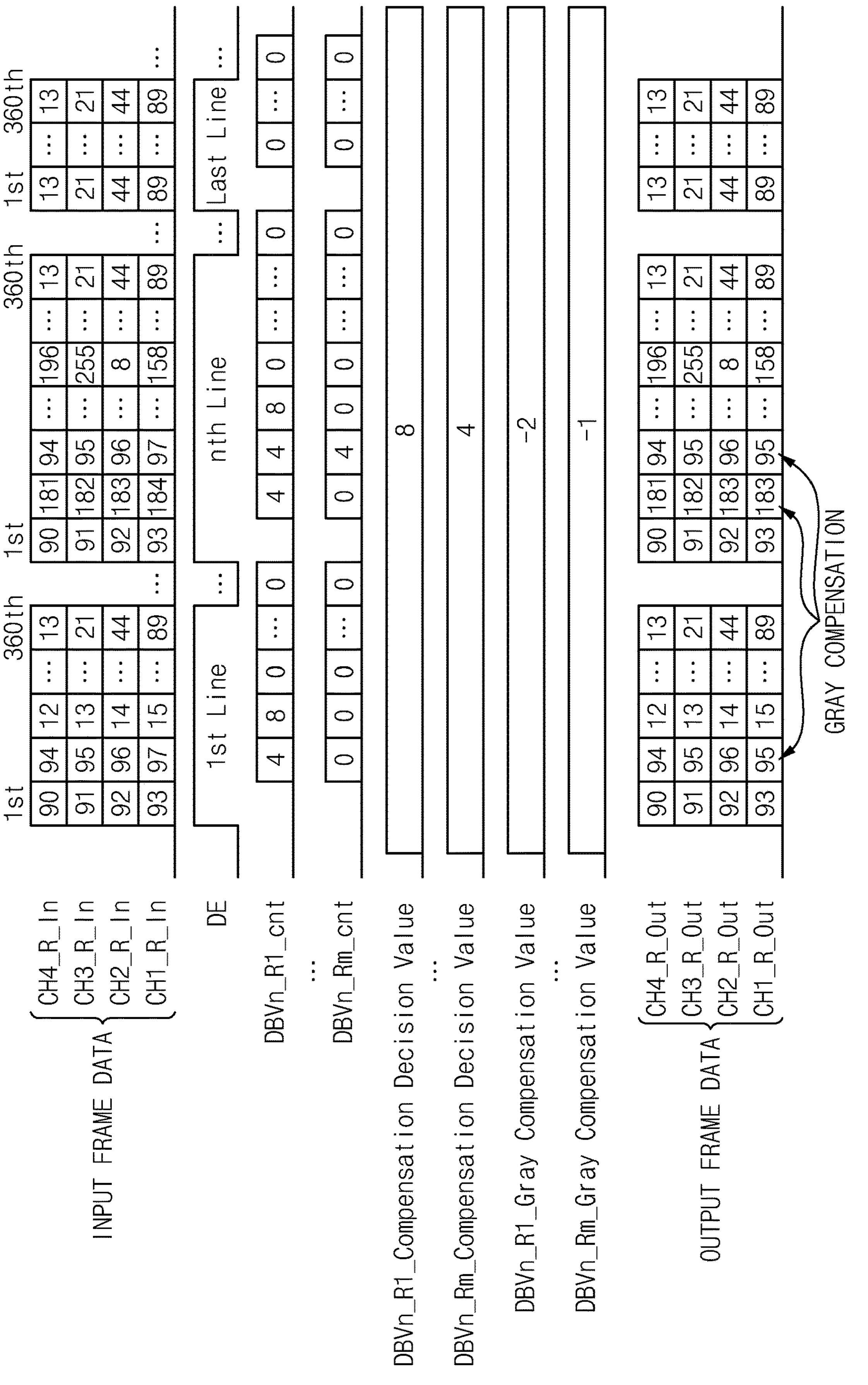
Figure 21:
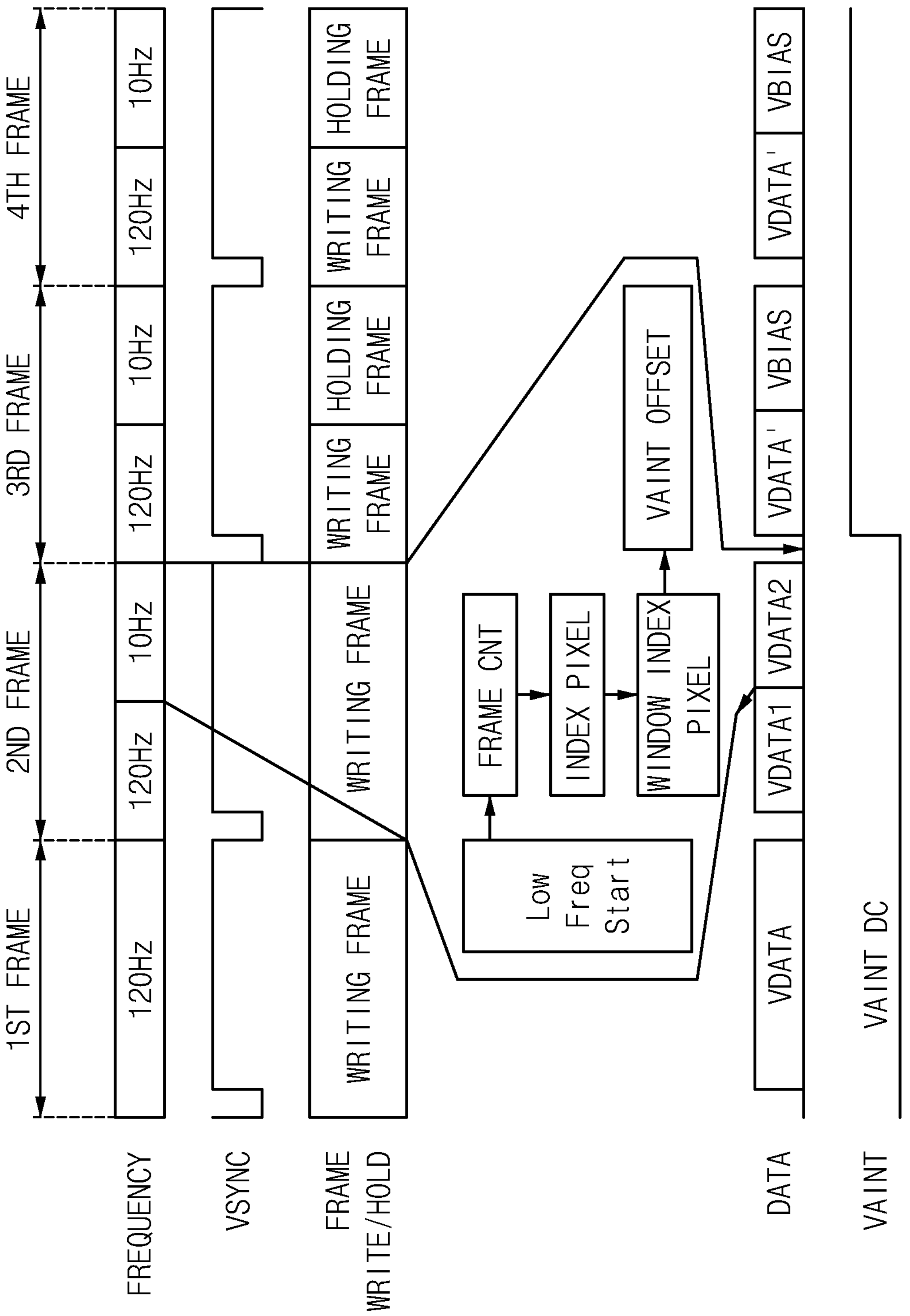
FIG. 21 is a timing diagram for describing the method of driving the display device described with reference to FIG. 12*a* and FIG. 12*b* according to embodiments.

FIG. 20 shows one example in which the first section group is selected so that the first to $m^{th}$ gray level sections R1 to Rm are selected.

Input frame data including pixel data may be provided to the second calculator 171. Since the frame data corresponding to the first display area 21 among the all frame data is defined as the frame data corresponding to the high frequency area, the input frame data shown in FIG. 20 may be the frame data corresponding to the high frequency area, in which a first line may correspond to a first line in the first display area 21, and a last line may correspond to a last line in the first display area 21. The first line may be the first pixel row among the first to $m^{th}$ pixel rows, and the last line may be the $(i-1)^{th}$ pixel row among the first to $m^{th}$ pixel rows.

The second calculator 171 may count/determine a number of the pixel data values in the range of 90 to 99, which is the low gray level range of the first gray level section R1, in the input frame data. Since the compensation decision value of the first gray level section R1 is 8, and the gray level compensation value of the first gray level section R1 is −2, 97, which is eighth pixel data in pixel data corresponding to the first pixel row, has been compensated for by −2 in output frame data. In addition, 97, which is eighth pixel data in pixel data corresponding to an $n^{th}$ pixel row, has been compensated for by −2 in the output frame data. The second calculator 171 may count the number of the pixel data values in the range of 90 to 99 (which is the low gray level range, in the input frame data up to 8), may compensate for a gray level of the eighth pixel data, may count the number of the pixel data values in the range of 90 to 99 (which is the low gray level range) in the input frame data from 0 to 8 again, and may compensate for the gray level of the eighth pixel data. The second calculator 171 may compensate for a gray level of (multiples of $8)^{th}$ (e.g., eighth, $16^{th}$, $24^{th}$, etc.) pixel data values in the input frame data in the first gray level section R1.

The second calculator 171 may count a number of pixel data values in the range of 180 to 187, which is the low gray level range of the $m^{th}$ gray level section Rm, in the input frame data. Since the compensation decision value of the $m^{th}$ gray level section Rm is 3, and the gray level compensation value of the $m^{th}$ gray level section Rm is −1, 184, which is eighth pixel data in the pixel data corresponding to the $n^{th}$ pixel row, has been compensated for by −1 in the output frame data. The second calculator 171 may count the number of the pixel data values in the range of 180 to 187 (which is the low gray level range, in the input frame data up to 8), may compensate for a gray level of the eighth pixel data, may count the number of the pixel data values in the range of 180 to 187 (which is the low gray level range) in the input frame data from 0 to 8 again, and may compensate for the gray level of the eighth pixel data. The second calculator 171 may compensate for a gray level of (multiples of 8)th (e.g., eighth, $16^{th}$, $24^{th}$, etc.) pixel data values in the input frame data in the $m^{th}$ gray level section Rm.

The pixel data of FIG. 20 may correspond to red pixel data, and the same process may be performed for green pixel data and blue pixel data.

After the above process steps are completely performed, the frame data corresponding to the high frequency area may be terminated/stopped (i.e., compensation of a gray level of preset pixel data among the pixel data within the low gray level range with respect to the frame data corresponding to the high frequency area may be terminated/stopped). After the frame data corresponding to the high frequency area is terminated, the frame data corresponding to the low frequency area may be terminated.

Referring to FIG. 21, in a third frame, the first display area 21 of the display panel 110 may be driven at 120 Hz, and the second display area 22 of the display panel 110 may be driven at 10 Hz. In the third frame, the first display area 21 may correspond to the data write period, and the compensated data voltage VDATA' may be provided to the pixel PX disposed in the first display area 21. In the third frame, the second display area 22 may correspond to the holding frame period, and the bias power supply voltage VBIAS may be provided to the pixel PX disposed in the second display area 22. In the third frame, the offset may be applied to the second initialization voltage VAINT. In the third frame, during a porch period of the vertical synchronization signal VSYNC, the first calculator 131 may determine that the offset has to be applied to the second initialization voltage VAINT, the first compensation signal generator 133 may generate the compensation signal CS to provide the generated compensation signal CS to the power supply unit 160. The power supply unit 160 may receive the compensation signal CS from the low frequency offset compensator 130 to perform a process of applying the offset to the second initialization voltage VAINT. In the third frame, after the porch period, the power supply unit 160 may output the second initialization voltage VAINT (to which the offset is applied). In the third frame, during the porch period of the vertical synchronization signal VSYNC, the second calculator 171 may receive the compensation signal CS from the low frequency offset compensator 130, and may generate the data compensation signal DCS to provide the generated data compensation signal DCS to the data driver 120. The data driver 120 may receive the data compensation signal DCS from the high frequency data compensator 170, so that in the third frame, after the porch period, the data driver 120 may generate the compensated data voltage VDATA' (in which the gray level of the preset pixel data among the pixel data provided to the first display area 21 is compensated for), and may output the compensated data voltage VDATA'.

Figure 22:
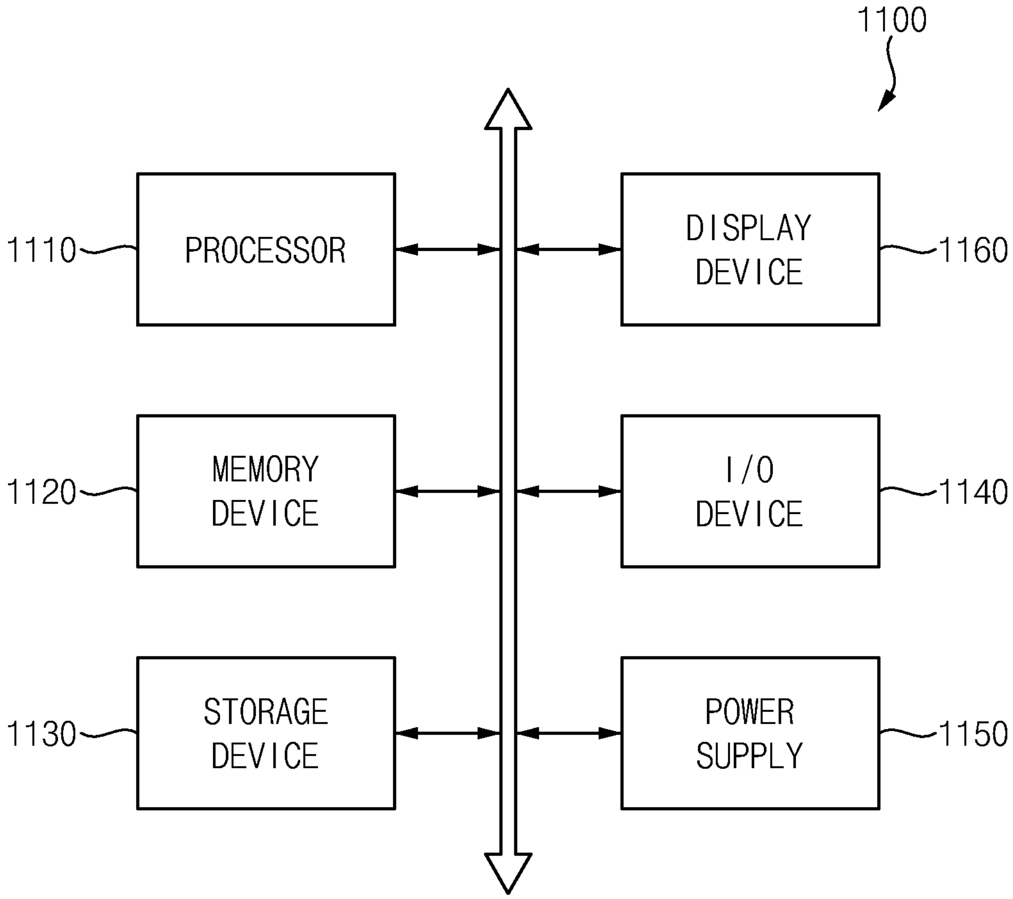
FIG. 22 is a block diagram illustrating an electronic device including a display device according to embodiments.

FIG. 22 is a block diagram illustrating an electronic device including a display device according to the present disclosure.

The electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform computing functions or tasks. The processor 1110 may be an application processor (AP), a microprocessor, a central processing unit (CPU), etc. The processor 1110 may be coupled to other components via an address bus, a control bus, a data bus, etc. The processor 1110 may be further coupled to an extended bus such as a peripheral component interconnection (PCI) bus.

The memory device 1120 may store data for operations of the electronic device 1100. The memory device 1120 may include at least one non-volatile memory device such as at least one of an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be/include at least one of a solid state drive (SSD) device, a hard disk drive (HDD) device, a CD-ROM device, etc. The I/O device 1140 may be/include an input device such as at least one of a keyboard, a keypad, a mouse, a touch screen, etc., and an output device such as at least one of a printer, a speaker, etc. The power supply 1150 may supply power for operations of the electronic device 1100. The display device 1160 may be coupled to other components through the buses or other communication links.

The display device 1160 may include a display panel including a plurality of pixels, a controller, a data driver, a gate driver, an emission driver, a power supply unit, a low frequency offset compensator, a high frequency data compensator, and the like. The low frequency offset compensator may include a calculator, a memory, and a compensation signal generator. The high frequency data compensator may include a second calculator, a second memory, and a second compensation signal generator. The display device 1160 includes the low frequency offset compensator and the high frequency data compensator, so that when the second display area of the display panel is driven at a low frequency, an offset (or adjustment voltage) may be selectively applied to the second initialization voltage so as to prevent a luminance deviation from occurring in the pixels disposed in the second display area. When the offset is applied to the second initialization voltage to be provided to the pixels disposed in the first display area, the high frequency data compensator may compensate for gray levels of some pixel data among the pixel data corresponding to the first display area, so as to prevent a luminance deviation from occurring in the pixels disposed in the first display area.

The electronic device 1100 may be a smart phone, a wearable electronic device, a tablet computer, a mobile phone, a television (TV), a digital TV, a 3D TV, a personal computer, a home appliance, a laptop computer, a personal digital assistant (PDA), a portable multimedia player (PMP), a digital camera, a music player, a portable game console, a navigation device, or the like.

Embodiments may be applied to various electronic devices including a display device. Embodiments may be applied to vehicle-display devices, ship-display devices, aircraft-display devices, portable communication devices, exhibition display devices, information transfer display devices, medical-display devices, etc.

The foregoing is illustrative of embodiments and is not to be construed as limiting. Although embodiments have been described, many modifications are possible in the embodiments. All such modifications are within the scope defined in the claims. oltage is applied to the second initialization voltage.

What is claimed is:

1. A display device comprising:

a display panel including a first display area and a second display area each including pixels;

a power supply unit configured to provide a first initialization voltage and a second initialization voltage to the display panel;

a voltage adjustment signal provider configured to provide a voltage adjustment signal to the power supply unit for applying an adjustment voltage to the second initialization voltage when the second display area is driven at a frequency lower than at least one of a predetermined frequency and a driving frequency of the first area; and a data adjustment signal provider configured to provide a data adjustment signal for adjusting gray levels of some pixels included in the first display area when the adjustment voltage is applied to the second initialization voltage.

2. The display device of claim 1, wherein the voltage adjustment signal provider is configured to determine a number of pixel data values within a preset gray level range based on gray level information of pixel data corresponding to the second display area and included in image data.

3. The display device of claim 2, wherein, when the number of the pixel data values within the preset gray level range is greater than or equal to a preset number, the voltage adjustment signal provider applies the adjustment voltage to the second initialization voltage.

4. The display device of claim 2, wherein, when the number of the pixel data values within the preset gray level range is less than a preset criterion, the voltage adjustment signal provider does not apply the adjustment voltage to the second initialization voltage.

5. The display device of claim 2, wherein the preset gray level range is from 0.2 nits to 1 nit.

6. The display device of claim 2, wherein the voltage adjustment signal provider includes:

a first memory storing display brightness values and a gray level range corresponding to each of the display brightness values;

a first calculator configured to determine whether the second display area is driven below at least one of the predetermined frequency and the driving frequency of the first area based on the image data, configured to select a selected display brightness value corresponding to a brightness level of the display panel, and configured to determine a selected gray level range of the selected display brightness value; and a first adjustment signal generator configured to generate the adjustment signal, and configured to provide the voltage adjustment signal to the power supply unit.

7. The display device of claim 6, further comprising: a data driver configured to provide data voltages to the display panel, and configured to provide adjusted data voltages to pixels included in the first display area when the data adjustment signal is received from the data adjustment signal provider.

8. The display device of claim 7, wherein the data adjustment signal provider includes:

a second memory storing gray level sections, each of which includes a gray level range, an adjustment decision value, and a gray level adjustment value, and storing section groups of the gray level sections;

a second calculator configured to select one section group among the section groups based on information on the selected display brightness value, and configured to determine pixel data for which gray levels are to be adjusted among pixel data corresponding to the first display area and included in the image data based on the selected gray level range, the adjustment decision value, and the gray level adjustment value; and a second adjustment signal generator configured to generate the data adjustment signal, and configured to provide the data adjustment signal to the data driver.

9. The display device of claim 1, wherein the voltage adjustment signal provider is configured to determine whether pixel data values corresponding to an index pixel group including at least four inconsecutive pixels selected from pixels disposed in a pixel row among pixels included in the second display area are within a predetermined gray level range.

10. The display device of claim 9, wherein, when a quantity of the pixel data values corresponding to the index pixel group within the predetermined gray level range is greater than or equal to a preset criterion, the voltage adjustment signal provider provides the voltage adjustment signal to the power supply unit.

11. The display device of claim 1, wherein the voltage adjustment signal provider is configured to determine whether pixel data values corresponding to a window index pixel group including at least four consecutive pixels selected from pixels disposed in a pixel row among pixels included in the second display area are within a predetermined gray level range.

12. The display device of claim 11, wherein, when a quantity of the pixel data values corresponding to the window index pixel group within the gray level range is greater than or equal to a preset criterion, the voltage adjustment signal provider provides the voltage adjustment signal to the power supply unit.

13. The display device of claim 1, wherein each of the pixels includes:

a light emitting element configured to output a light based on a driving current, and including a first terminal and a second terminal;

a driving transistor configured to generate the driving current, and including a first terminal configured to receive a first power supply voltage, a second terminal electrically connected to the first terminal of the light emitting element, and a gate terminal configured to receive the first initialization voltage; and a first switching transistor including a first terminal configured to receive the second initialization voltage, a second terminal electrically connected to the first terminal of the light emitting element, and a gate terminal to configured to receive a data write gate signal, the first switching transistor being configured to initialize the first terminal of the light emitting element to the second initialization voltage during an activation period of the data write gate signal.

14. The display device of claim 13, wherein each of the pixels further includes a second switching transistor including a first terminal configured to receive the first initialization voltage, a second terminal electrically connected to the gate terminal of the driving transistor, and a gate terminal configured to receive a data initialization gate signal, the second switching transistor being configured to initialize the gate terminal of the driving transistor to the first initialization voltage during an activation period of the data initialization gate signal.

15. The display device of claim 13, wherein each of the pixels further includes a third switching transistor including a first terminal configured to receive a data voltage, an adjusted data voltage, or a bias power supply voltage, a second terminal connected to the first terminal of the driving transistor, and a gate terminal configured to receive the data write gate signal, and wherein, when the adjustment voltage is applied to the second initialization voltage, the adjusted data voltage is applied to the first terminal of the third switching transistor included in each of some pixels included in the first display area, the data voltage is applied to the first terminal of the third switching transistor included in each remaining pixel included in the first display area, and the bias power supply voltage is applied to the first terminal of the third switching transistor included in each of the pixels included in the second display area.

16. The display device of claim 1, wherein the second initialization voltage is adjusted by the adjustment voltage and is provided to each of the first display area and the second display area.

17. A method of driving a display device, the display device comprising a first area and a second area, the method comprising:

determining whether to perform multi-frequency driving based on image data;

determining a determined gray level range of a display brightness value corresponding to a brightness level of a display panel;

determining whether pixel data of the second area is within a preset gray level range, a driving frequency of the second area being lower than at least one of a predetermined frequency and a driving frequency of the first area;

determining a number of pixel data values within the preset gray level range;

determining whether a number of gray level pixel data values of frame data corresponding to the second area is greater than or equal to a preset number;

applying an adjustment voltage to a second initialization voltage in each of the second area and the first area when the number of the gray level pixel data values of the frame data corresponding to the second area is greater than or equal to the preset number;

selecting a selected section group among section groups based on a selected display brightness value; and determining pixel data for which gray levels are to be adjusted among pixel data of frame data corresponding to the first area based on a selected gray level range, an adjustment decision value, and a gray level adjustment value that correspond to each of gray level sections included in the selected section group.

18. The method of claim 17, wherein the preset gray level range is from 0.2 nits to 1 nit.

19. The method of claim 17, further comprising:

determining whether pixel data values corresponding to an index pixel group are within the determined gray level range, the index pixel group including inconsecutive pixels;

determining whether a quantity of pixel data values corresponding to the index pixel group and being within the determined gray level range is greater than or equal to a first preset criterion;

determining whether pixel data values corresponding to a window index pixel group are within the determined gray level range, the window index pixel group including consecutive pixels; and determining a quantity pixel data values corresponding to the window index pixel group and being within the determined gray level range is greater than or equal to a second preset criterion.

20. The method of claim 17, further comprising: maintaining the second initialization voltage in the second area and the first area without applying the adjustment voltage when the number of the gray level pixel data values of the frame data corresponding to the second area is less than the preset number.

* * * * *